United States Patent [19]

Takiguchi et al.

[11] Patent Number: 5,624,600

[45] Date of Patent: Apr. 29, 1997

[54] OPTICALLY ACTIVE COMPOUND, LIQUID CRYSTAL COMPOSITION CONTAINING THE COMPOUND, LIQUID CRYSTAL DEVICE USING THE COMPOSITION, LIQUID CRYSTAL APPARATUS AND DISPLAY METHOD

[75] Inventors: Takao Takiguchi, Tokyo; Takashi Iwaki, Machida; Takeshi Togano, Yokohama; Yoko Kosaka, Atsugi; Shinichi Nakamura, Isehara, all of Japan

[73] Assignee: Canon Kabushiki Kaisha, Tokyo, Japan

[21] Appl. No.: 442,338

[22] Filed: May 16, 1995

[30] Foreign Application Priority Data

May 16, 1994 [JP] Japan .................................. 6-124670
Apr. 14, 1995 [JP] Japan .................................. 7-112700

[51] Int. Cl.$^6$ .............................. C09K 19/34; G02F 1/13; C07D 263/20
[52] U.S. Cl. ............................ 252/299.61; 252/299.01; 548/230; 349/182
[58] Field of Search ........................ 252/299.01, 299.61; 359/103; 548/230

[56] References Cited

U.S. PATENT DOCUMENTS

| | | | |
|---|---|---|---|
| 3,785,982 | 1/1974 | Okorodudu | 252/51.5 |
| 4,367,924 | 1/1983 | Clark et al. | 350/334 |
| 5,310,499 | 5/1994 | Scherowsky et al. | 252/299.61 |

FOREIGN PATENT DOCUMENTS

| | | |
|---|---|---|
| 0471201 | 2/1992 | European Pat. Off. . |
| 56-107216 | 8/1981 | Japan . |
| 03151371 | 6/1991 | Japan . |
| 04234378 | 8/1992 | Japan . |

OTHER PUBLICATIONS

Jones, Journal of the Chemical Society (1957) 2735–2743.

"Voltage–dependent optical activity of a twisted nematic liquid crystal", M. Schadt & W. Helfrich, Appl. Phys. Lett., v.18(4), 15 Feb. 1971, pp. 127–128.

*Primary Examiner*—Shean C. Wu
*Attorney, Agent, or Firm*—Fitzpatrick, Cella, Harper & Scinto

[57] ABSTRACT

An optically active compound represented by a formula (I) characterized by containing an oxazolidinone-3,5-diyl skeleton directly connected to cyclic groups in 3 and 5 positions is suitable as a component for a liquid crystal composition providing improved response characteristics and a high contrast. A liquid crystal device is constituted by disposing the liquid crystal composition between a pair of electrode plates. The liquid crystal device may preferably be used as a display panel constituting a liquid crystal apparatus providing good display characteristics.

18 Claims, 8 Drawing Sheets

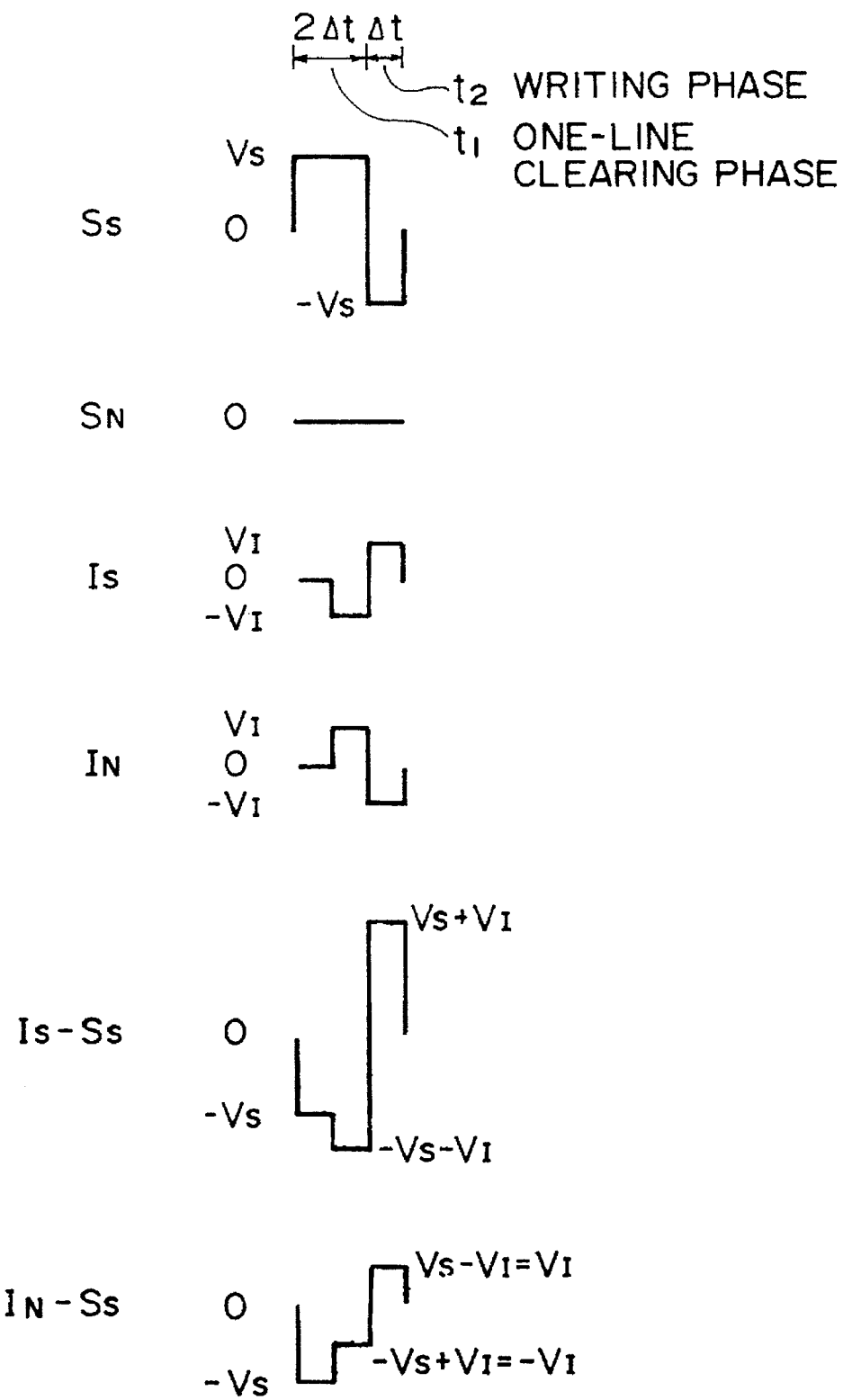
F I G. 5A

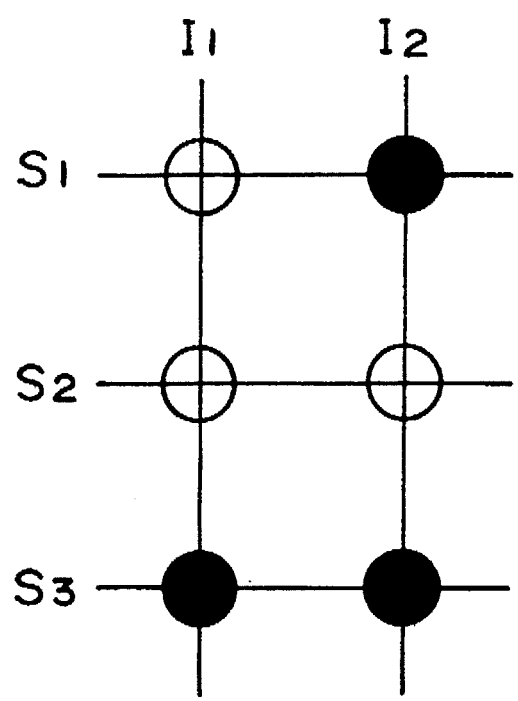
F I G. 6

OPTICALLY ACTIVE COMPOUND, LIQUID CRYSTAL COMPOSITION CONTAINING THE COMPOUND, LIQUID CRYSTAL DEVICE USING THE COMPOSITION, LIQUID CRYSTAL APPARATUS AND DISPLAY METHOD

FIELD OF THE INVENTION AND RELATED ART

The present invention relates to an optically active compound, a liquid crystal composition, a liquid crystal device, a liquid crystal apparatus and a display method, and more particularly to an optically active mesomorphic compound, a liquid crystal composition containing the compound with improved responsiveness to an electric field, a liquid crystal device using the composition for use in a liquid crystal display device, a liquid crystal-optical shutter, etc., a liquid crystal apparatus using the device, particularly as a display device, and a display method of using the composition.

Hitherto, liquid crystal devices have been used as an electro-optical device in various fields. Most liquid crystal devices which have been put into practice use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

These devices are based on the dielectric alignment effect of a liquid crystal and utilize an effect that the average molecular axis direction is directed to a specific direction in response to an applied electric field because of the dielectric anisotropy of liquid crystal molecules. It is said that the limit of response speed is on the order of milli-seconds, which is too slow for many uses. On the other hand, a simple matrix system of driving is most promising for application to a large-area flat display in view of cost, productivity, etc., in combination. In the simple matrix system, an electrode arrangement wherein scanning electrodes and signal electrodes are arranged in a matrix, and for driving, a multiplex driving scheme is adopted wherein an address signal is sequentially, periodically and selectively applied to the scanning electrodes and prescribed data signals are selectively applied in parallel to the signal electrodes in synchronism with the address signal.

When the above-mentioned TN-type liquid crystal is used in a device of such a driving system, a certain electric field is applied to regions where a scanning electrode is selected and signal electrodes are not selected (or regions where a scanning electrode is not selected and a signal electrode is selected), which regions are called "half-selected points". If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, display devices normally operate. However, in fact, as the number (N) of scanning lines increases, a time (duty ratio) during which an effective electric field is applied to one selected point when a whole image area (corresponding to one frame) is scanned decreases with a ratio of 1/N. Accordingly, the larger the number of scanning lines are, the smaller is the voltage difference of an effective value applied to a selected point and non-selected points when scanning is repeatedly effected. This leads to unavoidable drawbacks of lowering of image contrast or occurrence of interference or crosstalk. These phenomena are regarded as essentially unavoidable problems appearing when a liquid crystal having no bistability (i.e. liquid crystal molecules are horizontally oriented with respect to the electrode surface as stable state and is vertically oriented with respect to the electrode surface only when an electric field is effectively applied) is driven (i.e. repeatedly scanned) by making use of a time storage effect. To overcome these drawbacks, the voltage averaging method, the two-frequency driving method, the multiple matrix method, etc. have been already proposed. However, any method is not sufficient to overcome the above-mentioned drawbacks. As a result, the development of large image area or high packaging density in respect to display elements is delayed because it is difficult to sufficiently increase the number of scanning lines.

To overcome drawbacks with such prior art liquid crystal devices, the use of liquid crystal devices having bistability has been proposed by Clark and Lagerwall (e.g. Japanese Laid-Open Patent Appln. No. 56-107216; U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the above-mentioned TN-type liquid crystals are used, the bistable liquid crystal molecules are oriented to first and second optically stable states with respect to one and the other electric field vectors, respectively. Further, this type of liquid crystal has a property (bistability) of assuming either one of the two stable states in response to an applied electric and retaining the resultant state in the absence of an electric field.

In addition to the above-described characteristic of showing bistability, such a ferroelectric liquid crystal (hereinafter sometimes abbreviated as "FLC") has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of the above-mentioned problems with the conventional TN-type devices. Particularly, the application to a high-speed optical shutter and a display of a high density and a large picture is expected. For this reason, there has been made extensive research with respect to liquid crystal materials showing ferroelectricity. However, conventional ferroelectric liquid crystal materials do not sufficiently satisfy characteristics required of a liquid crystal device including low-temperature operation characteristic, high-speed responsiveness, high contrast, etc.

More specifically, among a response time $\tau$, the magnitude of spontaneous polarization Ps and viscosity $\eta$, the following relationship (II) exists: $\tau = \eta/(Ps.E) \ldots$ (II), where E is an applied voltage. Accordingly, a high response speed can be obtained by (a) increasing the spontaneous polarization Ps, (b) lowering the viscosity $\eta$, or (c) increasing the applied voltage E. However, the driving voltage has a certain upper limit in view of driving with IC, etc., and should desirably be as low as possible. Accordingly, it is actually necessary to lower the viscosity or increase the spontaneous polarization.

A ferroelectric chiral smectic liquid crystal having a large spontaneous polarization generally provides a large internal electric field in a cell given by the spontaneous polarization and is liable to pose many constraints on the device construction giving bistability. Further, an excessively large spontaneous polarization is liable to accompany an increase in viscosity, so that remarkable increase in response speed may not be attained as a result.

Moreover, if it is assumed that the operation temperature of an actual display device is 5°–40° C., the response speed changes by a factor of about 20, so that it actually exceeds the range controllable by driving voltage and frequency.

In general, in a liquid crystal device utilizing birefringence of a liquid crystal, the transmittance under right angle cross nicols is given by the following equation:

$$I/I_0 = \sin^2 4\theta \cdot \sin^2(\Delta n d/\lambda)\pi,$$

wherein $I_0$: incident light intensity, $I$: transmitted light intensity, $\theta$: tilt angle, $\Delta n$: refractive index anisotropy, $d$: thickness of the liquid crystal layer, $\lambda$: wavelength of the incident light.

Tilt angle $\theta$ in a ferroelectric liquid crystal with non-helical structure is recognized as a half of an angle between the average molecular axis directions of liquid crystal molecules in a twisted alignment in a first orientation state and a second orientation state. According to the above equation, it is shown that a tilt angle $\theta$ of 22.5 degrees provides a maximum transmittance and the tilt angle $\theta$ in a non-helical structure for realizing bistability should desirably be as close as possible to 22.5 degrees in order to provide a high transmittance and a high contrast.

However, when a birefringence of a liquid crystal is utilized in a liquid crystal device using a ferroelectric liquid crystal in a non-helical structure exhibiting bistability reported by Clark and Lagerwall, the following problems are encountered, thus leading to a decrease in contrast.

First, a tilt angle $\theta$ in a ferroelectric liquid crystal with a non-helical structure obtained by alignment with a polyimide film treated by rubbing of the prior art has become smaller as compared with a tilt angle Ⓗ (the angle Ⓗ is a half of the apex angle of the cone shown in FIG. 4 as described below) in the ferroelectric liquid crystal having a helical structure, thus resulting in a lower transmittance.

Secondly, even if the device provides a high contrast in a static state, i.e., under no electric field application, liquid crystal molecules fluctuate due to a slight electric field at a non-selection period of time in a matrix drive scheme in the case of applying a voltage to the liquid crystal molecules for providing a display image, thus resulting in the display image including a light (or pale) black display state, i.e., a decrease in a contrast.

Thus, as described hereinabove, commercialization of a ferroelectric liquid crystal device requires a liquid crystal composition assuming a chiral smectic phase which provides a high contrast, a high-speed responsiveness and a small temperature-dependence of response speed.

In order to afford uniform switching characteristics at display, a good view-angle characteristic, a good storage stability at a low temperature, a decrease in a load on a driving IC (integrated circuit), etc. to the above-mentioned ferroelectric liquid crystal device or a display apparatus including the ferroelectric liquid crystal device; the above-mentioned liquid crystal composition is required to optimize its properties such as spontaneous polarization, a helical pitch in chiral smectic C (SmC*) phase, a helical pitch in cholesteric (Ch) phase, a temperature range showing a mesomorphic phase, optical anisotropy, a tilt angle and dielectric anisotropy.

Particularly, in order to improve various properties as described above of a liquid crystal composition showing a chiral smectic phase, it is important to improve properties of an optically active compound used as a chiral dopant and as a component of the liquid crystal composition.

SUMMARY OF THE INVENTION

An object of the present invention is to provide an optically active compound effective in providing a liquid crystal composition with a large spontaneous polarization, a high speed responsiveness, a uniform alignment characteristic, a high contrast and a decreased temperature-dependence of response speed; a liquid crystal composition, particularly a (ferroelectric) chiral smectic liquid crystal composition containing the optically active compound as a component thereof in order to realize a practical liquid crystal device including a ferroelectric liquid crystal or a chiral smectic liquid crystal; a liquid crystal device including the liquid crystal composition and affording good display performances; a liquid crystal apparatus including the device; and a display method using the composition.

According to the present invention, there is provided an optically active compound represented by the following formula (I):

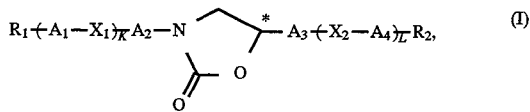

in which $R_1$ and $R_2$ independently denote halogen, H, CN, or a linear, branched or cyclized alkyl group having 2–30 carbon atoms, said alkyl group being capable of including one or two or more non-adjacent methylene groups which can be replaced by —O—, —S—, —CO—, —CO—O—, —O—CO—, —CH=CH— or —C≡C— and capable of including at least one H which can be replaced by F;

$A_2$ denotes 1,4-phenylene; 1,4-phenylene having one or two substituents selected from F, Cl, Br, CH$_3$, CF$_3$ and CN; pyrimidine-2,5-diyl; pyridine-2,5-diyl; thiophene-2,5-diyl; 2,6-naphthylene; thiazole-2,5-diyl; thiadiazole-2,5-diyl; pyrazine-2,5-diyl; pyridazine-3,6-diyl; benzothiazole-2,6-diyl; benzoxazole-2,5-diyl; indan-2,5-diyl; 2-alkylindan-2,5-diyl having a linear or branched alkyl group having 1–18 carbon atoms; coumaran-2,5-diyl; 2-alkylcoumaran-2,5-diyl having a linear or branched alkyl group having 1–18 carbon atoms; quinoxaline-2,6-diyl; or quinoline-2,6-diyl;

$A_1$, $A_3$ and $A_4$ independently denote $A_2$; 1,4-cyclohexylene; 1,3-dioxane-2,5-diyl; or 1,3-dithiane-2,5-diyl;

K and L are independently 0 or 1;

$X_1$ and $X_2$ independently denote a single bond, —COO—, —OCO—, —CH$_2$O—, —OCH$_2$—, —CH$_2$CH$_2$— or —C≡C—;

* denotes the location of an optically active center; and with the proviso that $R_1$ and $R_2$ cannot be H at the same time.

According to the present invention, there is further provided a liquid crystal composition containing at least one species of the above-mentioned optically active compound as an essential component thereof.

The present invention provides a liquid crystal device comprising a pair of electrode plates and the liquid crystal composition described above disposed between the electrode plates.

The present invention further provides a liquid crystal apparatus including the liquid crystal device, particularly including a display panel comprising the liquid crystal device.

The present invention still further provides a display method of using the liquid crystal composition described above and controlling the alignment direction of liquid crystal molecules in accordance with image data to effect display.

Heretofore, there have been known optically active oxazolidinone compounds used as a component of a liquid crystal composition as disclosed in Japanese Laid-Open Patent Applications (JP-A) (Kokai) Nos. 3-151371 and 4-234378, (corresponding to U.S. Pat. No. 5,310,499) and Lecture Preprint II for the 67th Annual Spring Meeting of the Chemical Society of Japan, P.636, 1B310 (1994) (issued Mar. 14, 1994).

These compounds have an oxazolidinone ring between a terminal alkyl group and an inner 1,4-phenylene skeleton. Thus, these compounds are distinguished from the above-mentioned optically active compound of the formula (I) containing an oxazolidinone ring directly connected (by a single bond) to two cyclic groups, respectively

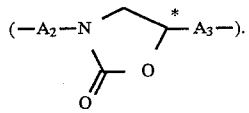

We have found that an optically active compound of the formula (I) containing an optically active oxazolidinone ring at a central cyclic skeleton, i.e., the oxazolidinone ring disposed between two cyclic groups through a single bond, has a high spontaneous polarization-imparting property and a viscosity-decreasing effect due to that of an oxazolidinone ring per se, whereby response characteristics of a resultant liquid crystal composition can be improved.

We have also found that such an optically active compound represented by the formula (I) is suitable as a component of a liquid crystal composition, particularly a chiral smectic or ferroelectric liquid crystal composition, and a liquid crystal device including the liquid crystal composition which provide good display characteristics based on improvements in various characteristics such as an alignment characteristic, switching characteristic, responsiveness, a temperature-dependence of response speed, and a contrast. As the optically active compound of the formula (I) according to the present invention has a good compatibility with another (mesomorphic) compound used herein, it is possible to use the optically active compound of the formula (I) as a chiral dopant and for controlling various properties such as spontaneous polarization, SmC* pitch, Ch pitch, a temperature range showing a mesomorphic phase, optical anisotropy, a tilt angle and dielectric anisotropy, with respect to a liquid crystal mixture or composition.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 5A shows unit driving waveforms used in an embodiment of the present invention.

FIG. 6 is an illustration of a display pattern obtained by an actual drive using the time-serial waveforms shown in FIG. 5B;

DETAILED DESCRIPTION OF THE INVENTION

Figure 1:
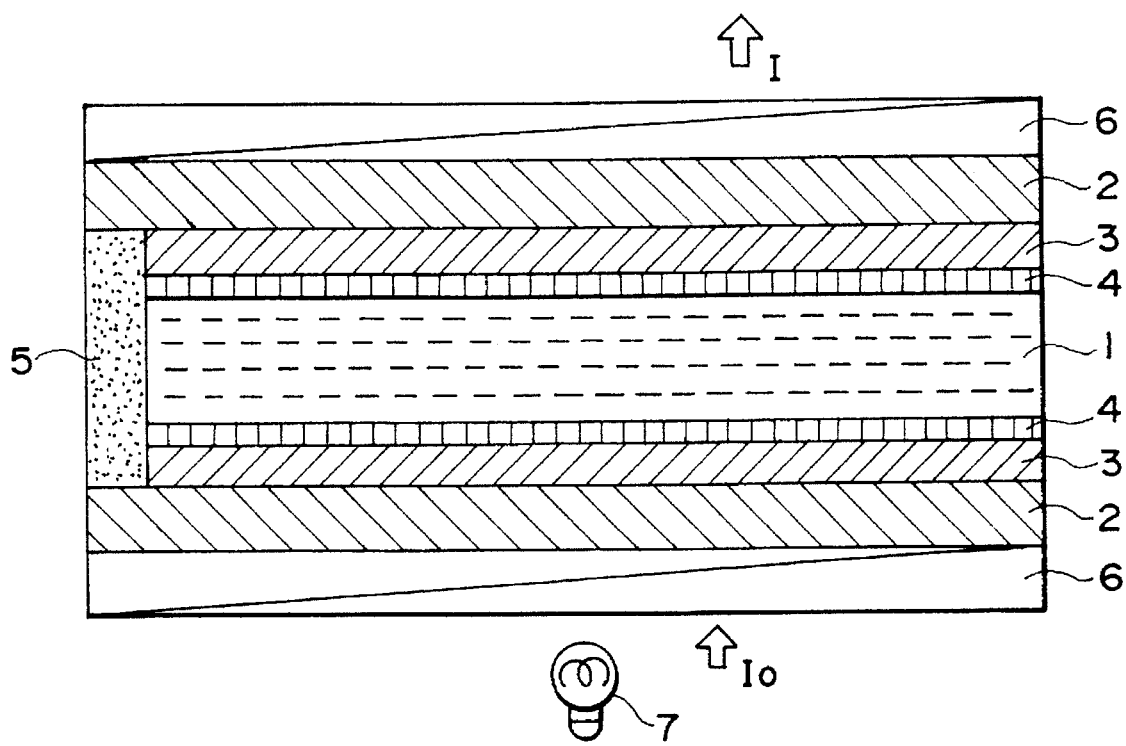
FIG. 1 is a schematic sectional view of a liquid crystal device using a liquid crystal composition assuming a chiral smectic phase.

The optically active compound of the formula (I) according to the present invention is characterized by containing an optically active oxazolidinone-3,5-diyl skeleton between two cyclic groups $A_2$ and $A_3$ described above. The optically active compound of the formula (I) may preferably satisfy any one of the following conditions (Ia) to (Ic):

(Ia) both of K and L are 0, (Ib) K is 0 and L is 1, and (Ic) K is 1 and L is 0.

When the optically active compound of the formula (I) satisfies the above condition (Ia), the optically active compound has a relatively low melting point and low viscosity, whereby the optically active compound is effective in providing a resultant liquid crystal composition with a high-speed responsiveness and a decreased temperature-dependence of response speed. The optically active compound also has a good compatibility or mutual solubility with another (other) mesomorphic compound(s).

On the other hand, if the above condition (Ib) or (Ic) is satisfied, the optically active compound of the formula (I) is effective in improving a temperature-dependence of response speed and an alignment characteristic with respect to a resultant liquid crystal composition and also providing a resultant liquid crystal device with a high contrast.

Examples of more preferred compounds of the optically active compound of the formula (I) may include those satisfying any one of the following conditions (Iaa) to (Ica), wherein the conditions (Ia) to (Ic) are restricted in respect of cyclic groups $A_1$ to A4:

(Iaa) both of K and L are 0; $A_2$ is 1,4-phenylene; 1,4-phenylene having one or two substituents, pyrimidine-2,5-diyl, pyridine-2,5-diyl, thiophene-2,5-diyl, 2,6-naphthylene, thiazole-2,5-diyl, thiadiazole-2,5-diyl, pyrazine-2,5-diyl or pyridazine-3,6-diyl; and $A_3$ is $A_2$, 1,4-cyclohexylene, 1,3-dioxane-2,5-diyl or 1,3-dithiane-2,5-diyl, (Iab) both of K and L are 0; $A_2$ is benzothiazole-2,6-diyl, benzoxazole-2,5-diyl, quinoxaline-2,6-diyl or quinoline-2,6-diyl; and $A_3$ is 1,4-cyclohexylene, 1,3-dioxane-2,5-diyl or 1,3-dithiane- 2,5-diyl, (Iba) K is 0 and L is 1; $A_2$ is 1,4-phenylene; 1,4-phenylene having one or two substituents, pyrimidine-2,5-diyl, pyridine-2,5-diyl, thiophene-2,5-diyl, 2,6-naphthylene, thiazole-2,5-diyl, thiadiazole-2,5-diyl, pyrazine-2,5-diyl or pyridazine-3,6-diyl; and each of $A_3$ and $A_4$ is $A_2$, 1,4-cyclohexylene, 1,3-dioxane-2,5-diyl or 1,3-dithiane-2,5-diyl, and (Ica) K is 1 and L is 0; $A_2$ is 1,4-phenylene; 1,4-phenylene having one or two substituents, pyrimidine-2,5-diyl, pyridine-2,5-diyl, thiophene-2,5-diyl, 2,6-naphthylene, thiazole-2,5-diyl, thiadiazole-2,5-diyl, pyrazine-2,5-diyl or pyridazine-3,6-diyl; and each of $A_1$ and $A_3$ is $A_2$, 1,4-cyclohexylene, 1,3-dioxane-2,5-diyl or 1,3-dithiane-2,5-diyl.

When the optically active compound of the formula (I) satisfies any one of the above conditions (Iaa) to (Ica), the above-mentioned effects of the conditions (Ia) to (Ic) are further improved.

Among optically active compounds of the formula (I) satisfying the above condition (Iaa), further preferred optically active compounds satisfy the following condition in which both of K and L in the formula (I) are 0; $A_2$ in the formula (I) is 1,4-phenylene or 1,4-phenylene having one or two substituents; and $A_3$ in the formula (I) is $A_2$ or 1,4-cyclohexylene.

Preferred examples of a substituents of 1,4-phenylene for $A_1$ to $A_4$ in the formula (I) may include halogen or $CF_3$, particularly F.

In the above-mentioned formula (I) each of $R_1$ and $R_2$ may preferably be any one of the following groups (i) to (xvi):

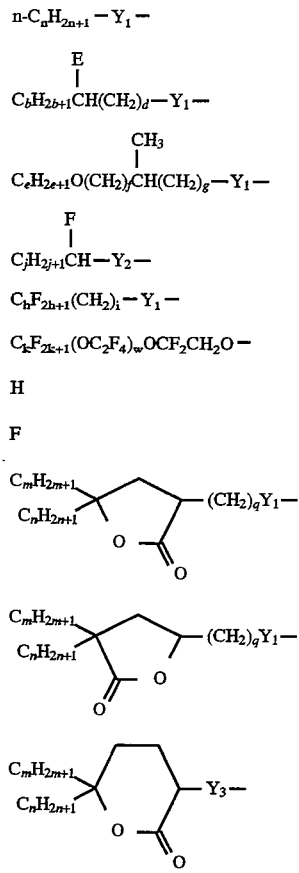

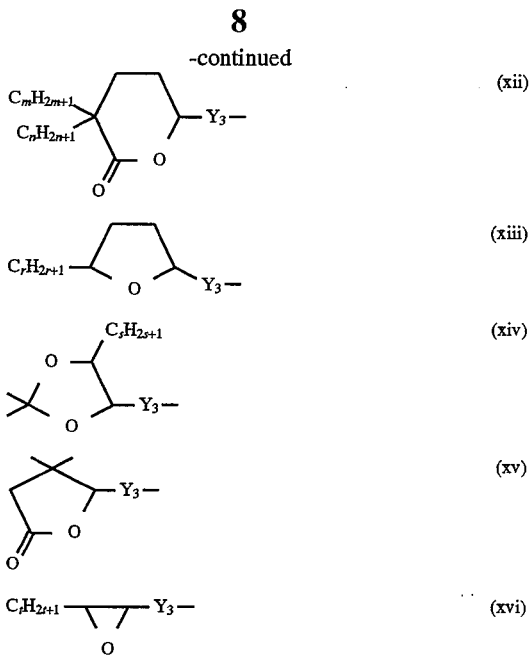

wherein a is an integer of 1–16; d, g and i independently denotes an integer of 0–7; b, c, h, j and k independently denotes an integer of 1–10; each of f and w is 0 or 1; m, n, q, r, s and t independently denote an integer of 0–10, with the proviso that $b+d \leq 16$, $e+f+g \leq 16$, and $h+i \leq 16$; E is $CH_3$ or $CF_3$; $Y_1$ is a single bond, —O—, —COO— or —OCO—; $Y_2$ is —COO—, —CH$_2$O—, CH$_2$CH$_2$O—, —CH$_2$CH$_2$CH$_2$O— or —CH$_2$CH$_2$—; and $Y_3$ is a single bond, —COO—, —CH$_2$O—, —OCO— or —OCH$_2$—.

In the case of each of $R_1$ and $R_2$ being any one of the above groups (i) to (viii), the optically active compound of the formula (I) has a good mutual solubility (or compatibility) and a low viscosity. When the above groups (ii), (iii), (iv) and (ix) to (xvi) are optically active groups, the optically active compound of the formula (I) is effective in improving a spontaneous polarization-imparting property and controlling a Ch pitch.

In the above-mentioned formula (I), $R_1$ and $R_2$ may be a cyclized alkyl group as described above. Herein, "cyclized alkyl group" means a cyclic alkyl group or an alkyl group having a partially cyclized structure in which the cyclized structure can be constituted by methylene group (or hydrocarbon group) and/or at least one heteroatom (e.g., oxygen) and at least one methylene group (or hydrocarbon group) in the alkyl group can be replaced with —O— or —CO—.

The optically active compound of the formula (I) according to the present invention may be a mesomorphic compound.

Herein, the term "mesomorphic compound" covers not only a compound assuming a mesomorphic (liquid crystal) phase but also a compound not assuming a mesomorphic phase per se as long as a liquid crystal composition containing such a compound assumes a mesomorphic phase.

The optically active compound of the formula (I) may generally be synthesized through, e.g., the following reaction scheme.

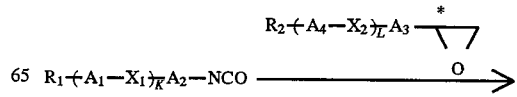

-continued

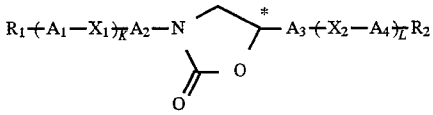

In the above $R_1$, $A_1$, $X_1$, $K$, $A_2$, $A_3$, $X_2$, $A_4$, $L$ and $R_2$ are the same as those defined above.

In the above reaction scheme, it is possible to form $R_1\text{-}(A_1\text{-}X_1)_K$ and $R_2\text{-}(A_4\text{-}X_2)_L$ after effecting ring closure to (or ring formation of) oxazolidinone by using an appropriate group, such as methoxy group, bromine atom, iodine atom, benzyloxy group or acetyl group, capable of being modified or converted into $R_1\text{-}(A_1\text{-}X_1)_K$ and $R_2\text{-}(A_4\text{-}X_2)_L$.

Specific examples of the optically active (mesomorphic) compound of the formula (I) may include those represented by the following structural formulae including abbreviations used herein for respective cyclic groups listed below.

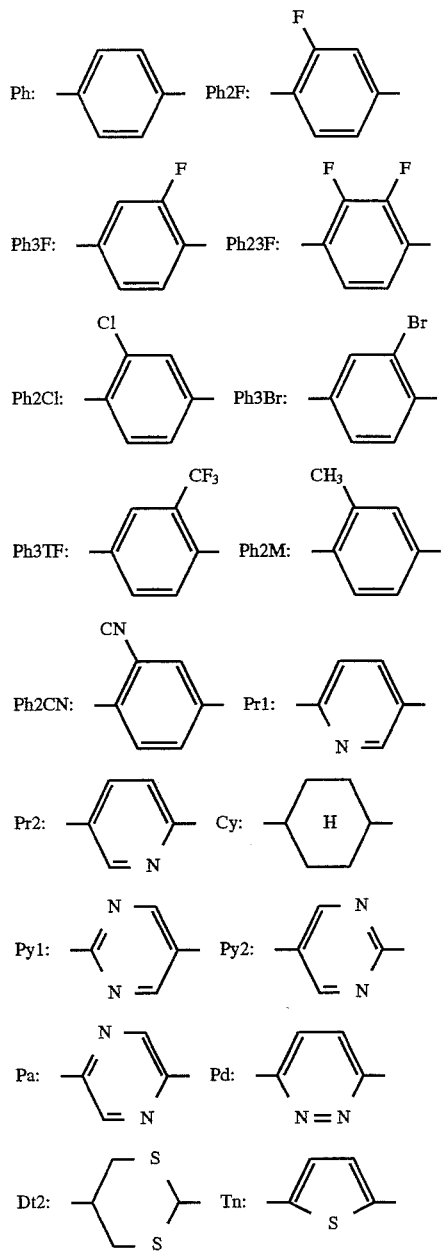

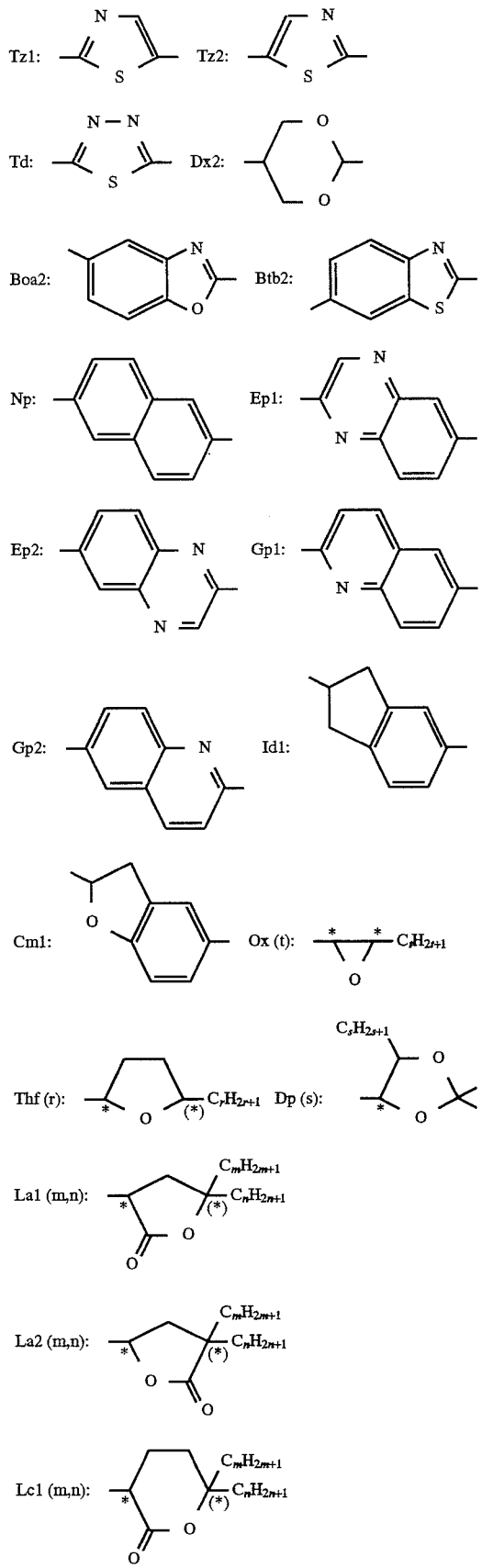

-continued

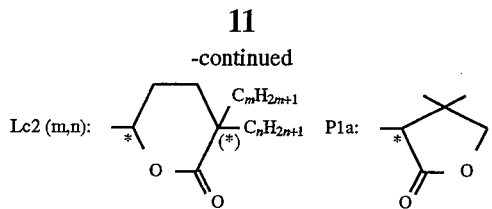

In the above, t, r, s, m and n are independently an integer of 0–18, preferably 0–10.

TABLE 1

$$R_1 \!\!-\!\!(A_1\!\!-\!\!X_1)_{\overline{K}}\!\!-\!\!A_2\!\!-\!\!N\!\!\underset{\underset{O}{\diagdown}}{\overset{*}{\diagup}}\!\!A_3\!\!-\!\!(X_2\!\!-\!\!A_4)_{\overline{L}}R_2$$

| No. | $R_1$ | $A_1$ | $X_1$ | $A_2$ | $A_3$ | $X_2$ | $A_4$ | $R_2$ |
|---|---|---|---|---|---|---|---|---|
| 1 | $C_2H_5$ | — | — | Ph | Ph | — | — | $C_3H_7$ |
| 2 | $C_4H_9$ | — | — | Ph | Ph | — | — | $C_6H_{13}$ |
| 3 | $C_9H_{19}$ | — | — | Ph | Ph | — | — | $C_8H_{17}$ |
| 4 | $C_{12}H_{25}$ | — | — | Ph | Ph | — | — | $C_{14}H_{29}$ |
| 5 | $C_4H_9$ | — | — | Ph | Cy | — | — | $C_3H_7$ |
| 6 | $C_{10}H_{21}O$ | — | — | Ph | Cy | — | — | $C_6H_{13}$ |
| 7 | $C_7H_{15}\underset{\underset{O}{\|\|}}{C}O$ | — | — | Ph | Cy | — | — | $C_4H_9$ |
| 8 | $CH_3O$ | — | — | Ph | Ph | — | — | H |
| 9 | $C_3H_7O\underset{\underset{O}{\|\|}}{C}$ | — | — | Ph | Cy | — | — | $C_5H_{11}$ |
| 10 | $C_8F_{17}CH_2O$ | — | — | Ph | Cy | — | — | $C_6H_{13}$ |
| 11 | $C_8H_{17}\overset{F}{\underset{*}{C}}HCH_2O$ | — | — | Ph | Ph | — | — | $C_6H_{13}$ |
| 12 | $C_4H_9O$ | — | — | Ph | Ph | — | — | $C_6H_{13}$ |
| 13 | $C_4F_9O(CF_2)_2OCF_2CH_2O$ | — | — | Ph | Cy | — | — | $C_8H_{17}$ |
| 14 | $C_5H_{11}\overset{F}{\underset{*}{C}}HCH_2O$ | — | — | Ph | Cy | — | — | $C_3H_7$ |
| 15 | $C_6H_{13}O$ | — | — | Ph3F | Cy | — | — | $C_5H_{11}$ |
| 16 | $C_6H_{13}O$ | — | — | Ph | Ph | — | — | $C_6H_{13}$ |
| 17 | $C_{12}H_{25}O$ | — | — | Ph2F | Cy | — | — | $C_4H_9$ |
| 18 | La2(4,0)(CH$_2$)$_6$ | — | — | Ph | Cy | — | — | $C_3H_7$ |
| 19 | Pla$\underset{\underset{O}{\|\|}}{C}$O | — | — | Ph | Cy | — | — | $C_5H_{11}$ |
| 20 | $C_8H_{17}$ | — | — | Ph | Ph | — | — | H |
| 21 | La1(5,0)CH$_2$O | — | — | Ph | Cy | — | — | $C_5H_{11}$ |
| 22 | $C_{14}H_{29}$ | — | — | Ph | Cy | — | — | $C_8H_{17}$ |
| 23 | $C_8H_{17}O$ | — | — | Ph | Ph | — | — | $C_6H_{13}$ |
| 24 | $C_{13}H_{27}O$ | — | — | Ph | Ph | — | — | $C_{10}H_{21}$ |
| 25 | $C_5H_{11}O$ | — | — | Ph | Ph | — | — | $OC_4H_9$ |
| 26 | $C_8H_{17}O$ | — | — | Ph | Ph | — | — | $OC_9H_{19}$ |
| 27 | $C_5H_{11}O$ | — | — | Ph | Cy | — | — | $C_4H_9$ |
| 28 | $C_2H_5\overset{CH_3}{\underset{*}{C}}H(CH_2)_3O$ | — | — | Ph | Cy | — | — | $C_{86}H_{17}$ |
| 29 | $C_5H_{11}$ | — | — | Py2 | Ph | — | — | $C_6H_{13}$ |
| 30 | $C_{12}H_{25}$ | — | — | Py2 | Ph | — | — | $C_{10}H_{21}$ |
| 31 | Br | — | — | Ph | Ph | — | — | H |
| 32 | $C_{12}H_{25}O$ | — | — | Ph | Ph | — | — | $OC_{15}H_{31}$ |

TABLE 1-continued $$R_1\text{-}(A_1\text{-}X_1)_{\overline{K}}\text{-}A_2\text{-}N\underset{O}{\overset{*}{\diagdown}}A_3\text{-}(X_2\text{-}A_4)_{\overline{L}}R_2$$

| No. | $R_1$ | $A_1$ | $X_1$ | $A_2$ | $A_3$ | $X_2$ | $A_4$ | $R_2$ |
|---|---|---|---|---|---|---|---|---|
| 33 | $\underset{*}{C_6H_{13}\overset{F}{\overset{\|}{C}H}CH_2O}$ | — | — | Ph | Ph | — | — | $\underset{*}{OCH_2\overset{F}{\overset{\|}{C}H}C_6H_{13}}$ |
| 34 | $C_7H_{15}$ | — | — | Py2 | Ph | — | — | $OC_9H_{19}$ |
| 35 | $C_8H_{17}O$ | — | — | Py2 | Ph | — | — | $OC_8H_{17}$ |
| 36 | $C_6H_{13}$ | — | — | Py2 | Ph | — | — | $OCH_2CF_2O(CF_2)_2OC_4F_9$ |
| 37 | $C_{11}H_{23}$ | — | — | Py2 | Ph2F | — | — | $OC_7H_{15}$ |
| 38 | $C_9H_{19}$ | — | — | Py2 | Ph3F | — | — | $OCH_2C_8H_{17}$ |
| 39 | $C_7H_{15}$ | — | — | Py2 | Cy | — | — | $C_3H_7$ |
| 40 | $C_8H_{17}$ | — | — | Py2 | Cy | — | — | $C_6H_{13}$ |
| 41 | $C_6H_{13}\overset{\overset{O}{\|}}{C}O$ | — | — | Ph | Ph | — | — | $C_4H_9$ |
| 42 | $C_6H_{13}\overset{\overset{O}{\|}}{C}O$ | — | — | Ph | Ph | — | — | $OC_5H_{11}$ |
| 43 | $C_4H_9$ | — | — | Ph | Ph | — | — | $O\overset{\overset{O}{\|}}{C}C_8H_{17}$ |
| 44 | $C_2H_5\overset{CH_3}{\overset{\|}{C}H}(CH_2)_6O$ | — | — | Ph | Ph | — | — | $C_5H_{11}$ |
| 45 | $C_8F_{17}CH_2O$ | — | — | Ph | Ph | — | — | $C_6H_{13}$ |
| 46 | $C_8H_{17}$ | — | — | Ph | Ph | — | — | H |
| 47 | $C_{12}H_{25}O$ | — | — | Py2 | Cy | — | — | $C_8H_{17}$ |
| 48 | $C_4H_9$ | — | — | Py1 | Ph | — | — | $C_6H_{13}$ |
| 49 | $C_7H_{15}S$ | — | — | Py1 | Ph | — | — | $OC_5H_{11}$ |
| 50 | $C_6H_{13}$ | — | — | Pr2 | Ph | — | — | $OC_8H_{17}$ |
| 51 | $\underset{*}{C_4H_9\overset{CF_3}{\overset{\|}{C}H}(CH_2)_2O}$ | — | — | Ph | Ph | — | — | $C_8H_{17}$ |
| 52 | $\underset{*}{C_3H_7OC\overset{CH_3}{\overset{\|}{H}}CH_2O}$ | — | — | Ph | Ph | — | — | $C_{10}H_{21}$ |
| 53 | F | — | — | Ph2F | Ph | — | — | $C_8H_{17}$ |
| 54 | $C_8H_{17}$ | — | — | Pr2 | Ph | — | — | $C_6H_{13}$ |
| 55 | $C_{10}H_{21}$ | — | — | Pr2 | Ph | — | — | $CH_2C_6F_{13}$ |
| 56 | $C_8H_{17}O$ | — | — | Pr2 | Ph | — | — | $OC_7H_{15}$ |
| 57 | $C_4H_9$ | — | — | Pr2 | Cy | — | — | $C_5H_{11}$ |
| 58 | $C_2H_5O$ | — | — | Py1 | Ph | — | — | $C_6H_{13}$ |
| 59 | $C_5H_{11}\overset{\overset{O}{\|}}{C}O$ | — | — | Ph | Ph | — | — | H |
| 60 | $C_{10}H_{21}O$ | — | — | Py1 | Ph | — | — | $OC_{12}H_{25}$ |
| 61 | $C_3H_7$ | — | — | Tn | Ph | — | — | $C_6H_{13}$ |
| 62 | $C_8H_{17}$ | — | — | Tn | Ph | — | — | $OC_{10}H_{21}$ |
| 63 | $C_4F_9O(CF_2)_2OCF_2CH_2O$ | — | — | Ph | Ph | — | — | $C_6H_{13}$ |
| 64 | $C_4H_9$ | — | — | Ph | Ph | — | — | $(CH_2)_2La1(6,0)$ |
| 65 | $C_6H_{13}$ | — | — | Ph | Ph | — | — | $OCH_2Lc2(1,0)$ |
| 66 | $\underset{*}{C_8H_{17}\overset{F}{\overset{\|}{C}H}CH_2O}$ | — | — | Ph | Ph | — | — | H |
| 67 | $C_6F_{13}CH_2O$ | — | — | Ph | Ph | — | — | $OCH_2C_6F_{13}$ |
| 68 | $C_{10}H_{21}$ | — | — | Ph | Ph | — | — | $OCH_2La2(5,0)$ |

TABLE 1-continued

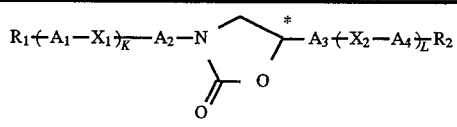

| No. | $R_1$ | $A_1$ | $X_1$ | $A_2$ | $A_3$ | $X_2$ | $A_4$ | $R_2$ |
|---|---|---|---|---|---|---|---|---|
| 69 | Thf(0)—CO—$\parallel$O | — | — | Ph | Ph | — | — | $C_6H_{13}$ |
| 70 | $C_7H_{15}O$ | — | — | Ph | Ph | — | — | $C_2H_5$ |
| 71 | $C_{10}H_{21}O$ | — | — | Ph | Ph | — | — | $C_8H_{17}$ |
| 72 | F | — | — | Ph | Ph | — | — | $C_6H_{13}$ |
| 73 | $C_3H_7O$ | — | — | Ph2F | Ph | — | — | $c_5H_{11}$ |
| 74 | $C_8H_{17}O$ | — | — | Ph2F | Ph | — | — | $C_6H_{13}$ |
| 75 | $CH_2{=}CH(CH_2)_5O$ | — | — | Ph3F | Ph | — | — | $C_{10}H_{21}$ |
| 76 | $C_2H_5S(CH_2)_4O$ | — | — | Ph3F | Ph | — | — | $C_{12}H_{25}$ |
| 77 | $C_9H_{19}$ | — | — | Ph | Ph2F | — | — | $OCH_2C_{10}F_{21}$ |
| 78 | $C_4H_9$ | — | — | Ph | Ph3F | — | — | $OC_7H_{15}$ |
| 79 | $C_8H_{17}$ | — | — | Ph23F | Ph | — | — | $C_6H_{13}$ |
| 80 | $C_5H_{11}O$ | — | — | Ph23F | Ph | — | — | $C_9H_{19}$ |
| 81 | $C_7H_{15}O$ | — | — | Ph2Cl | Ph | — | — | $C_{12}H_{25}$ |
| 82 | $C_{10}H_{21}O$ | — | — | Ph2CN | Ph | — | — | $C_{11}H_{23}$ |
| 83 | $C_6H_{13}O$ | — | — | Ph3TF | Ph | — | — | $C_6H_{13}$ |
| 84 | $F_9C_4O(CF_2)_2OCF_2CH_2O$ | — | — | Ph | Ph | — | — | $OCH_2CF_2O(CF_2)_2OC_4F_9$ |
| 85 | $C_{10}H_{21}$ | — | — | Tn | Cy | — | — | $C_8H_{17}$ |
| 86 | $C_6H_{13}$ | — | — | Np | Ph | — | — | $C_4H_9$ |
| 87 | $C_4F_9O(CF_2)_2OCF_2CH_2O$ | — | — | Np | Ph | — | — | $C_6H_{13}$ |
| 88 | $C_{10}H_{21}O$ | — | — | Np | Ph | — | — | $OC_7H_{15}$ |
| 89 | $C_8H_{17}$ | — | — | Np | Cy | — | — | $C_3H_7$ |
| 90 | $C_4H_9$ | — | — | Ph | Ph | — | — | $OCH_3$ |
| 91 | $C_8H_{17}OC$$\parallel$O | — | — | Ph | Ph | — | — | $C_7H_{15}$ |
| 92 | $C_4H_9$ | — | — | Ph | Ph | — | — | $COC_5H_{11}$$\parallel$O |
| 93 | $C_6H_{13}C{\equiv}C$ | — | — | Ph | Ph | — | — | $C_4H_9$ |
| 94 | F$\mid$$C_4H_9CHCH_2O$* | — | — | Np | Cy | — | — | $C_5H_{11}$ |
| 95 | $(CH_3)_2CH(CH_2)_3CO$$\parallel$O | — | — | Np | Cy | — | — | $C_8H_{17}$ |
| 96 | $C_4H_9$ | — | — | Tz2 | Ph | — | — | $C_6H_{13}$ |
| 97 | $C_8H_{17}$ | — | — | Tz2 | Ph | — | — | $OCH_2C_4F_{11}$ |
| 98 | $C_{11}H_{23}$ | — | — | Tz2 | Cy | — | — | $C_3H_7$ |
| 99 | $C_5H_{11}$ | — | — | Tz1 | Ph | — | — | $C_5H_{11}$ |
| 100 | $C_6H_{13}$ | — | — | Tz1 | Ph | — | — | $OC_7H_{15}$ |
| 101 | $C_9H_{19}$ | — | — | Tz1 | Cy | — | — | $C_4H_9$ |
| 102 | $C_3H_7$ | — | — | Td | Ph | — | — | $C_{12}H_{25}$ |
| 103 | F$\mid$$C_8H_{17}CH$* | — | — | Td | Ph | — | — | $OC_9H_{19}$ |
| 104 | $C_{15}H_{31}$ | — | — | Td | Cy | — | — | $C_5H_{11}$ |
| 105 | $C_4H_9$ | — | — | Ph | Ph | — | — | $OC_8H_{17}$ |
| 106 | Ox(3)CO$\parallel$O | — | — | Ph | Ph | — | — | $C_8H_{17}$ |
| 107 | $C_{10}H_{21}O$ | — | — | Ph | Ph | — | — | $C_6H_{13}$ |
| 108 | $C_9H_{19}O$ | — | — | Ph | Ph | — | — | $OC_7H_{15}$ |
| 109 | La1(7,0)$CH_2O$ | — | — | Ph | Ph | — | — | $C_{10}H_{21}$ |

TABLE 1-continued $$R_1 \vdash A_1 - X_1 \dashv_K - A_2 - N \overset{*}{\underset{O}{\diagdown}} A_3 \vdash X_2 - A_4 \dashv_L R_2$$

| No. | $R_1$ | $A_1$ | $X_1$ | $A_2$ | $A_3$ | $X_2$ | $A_4$ | $R_2$ |
|---|---|---|---|---|---|---|---|---|
| 110 | $\underset{*}{C_{10}H_{21}\overset{F}{\underset{|}{C}}HCH_2O}$ | — | — | Ph | Ph | — | — | $OCH_2C_5F_{11}$ |
| 111 | $C_7H_{15}$ | — | — | Pa | Ph | — | — | $C_8H_{17}$ |
| 112 | $C_{10}H_{21}$ | — | — | Pa | Ph | — | — | $OC_{12}H_{25}$ |
| 113 | $C_{14}H_{29}$ | — | — | Pa | Cy | — | — | $C_6H_{13}$ |
| 114 | $C_3H_7$ | — | — | Pd | Ph | — | — | $C_{10}H_{21}$ |
| 115 | $C_6H_{13}O$ | — | — | Pd | Ph | — | — | $OC_7H_{15}$ |
| 116 | $C_9H_{19}$ | — | — | Pd | Cy | — | — | $C_8H_{17}$ |
| 117 | $C_{10}H_{21}$ | — | — | Ph | Np | — | — | $OCH_2CF_2O(CF_2)_2OC_4F_9$ |
| 118 | $C_4H_9O$ | — | — | Ph | Np | — | — | $OCH_2La1(5,0)$ |
| 119 | $C_8H_{17}$ | — | — | Ph | Np | — | — | $C_5H_{11}$ |
| 120 | $C_7H_{15}O$ | — | — | Ph2F | Np | — | — | $\underset{*}{O(CH_2)_3\overset{CH_3}{\underset{|}{C}}HOC_4H_9}$ |
| 121 | $C_4H_9$ | — | — | Ph | Py1 | — | — | $C_6H_{13}$ |
| 122 | $C_6H_{13}O$ | — | — | Ph3F | Py1 | — | — | $C_9H_{19}$ |
| 123 | $C_8F_{17}CH_2O$ | — | — | Ph | Pr1 | — | — | $C_5H_{11}$ |
| 124 | $C_5H_{11}$ | — | — | Ph | Pr1 | — | — | $C_7H_{17}$ |
| 125 | $C_9H_{19}$ | — | — | Py2 | Py1 | — | — | $C_{10}H_{21}$ |
| 126 | $CH_3O$ | — | — | Ph | Ph | — | — | $OCH_3$ |
| 127 | $C_7H_{15}$ | — | — | Btb2 | Cy | — | — | $C_3H_7$ |
| 128 | $C_8H_{17}$ | — | — | Ep2 | Cy | — | — | $C_8H_{17}$ |
| 129 | $C_6H_{13}$ | — | — | Boa2 | Cy | — | — | $C_5H_{11}$ |
| 130 | $C_{10}H_{21}$ | — | — | Gp2 | Ph | — | — | $OCH_2CF_2OC_2F_5$ |
| 131 | $C_5H_{11}$ | — | — | Ep2 | Ph | — | — | $\overset{OCOx(3)}{\underset{O}{\parallel}}$ |
| 132 | $C_9H_{19}$ | — | — | Cm1 | Ph | — | — | $\overset{OCC_4H_9}{\underset{O}{\parallel}}$ |
| 133 | $C_3H_7$ | — | — | Gp2 | Cy | — | — | $C_6H_{13}$ |
| 134 | $C_{10}H_{21}O$ | — | — | Gp2 | Dx2 | — | — | $C_8H_{17}$ |
| 135 | $C_4F_9CH_2O$ | — | — | Ep2 | Dt2 | — | — | $C_5H_{19}$ |
| 136 | $C_2H_5$ | — | — | Ph | Ph | — | Ph | $C_6H_{13}$ |
| 137 | $C_4H_9$ | — | — | Ph | Ph | — | Ph | $OCH_2C_5F_{11}$ |
| 138 | $C_8H_{17}$ | — | — | Ph | Ph | — | Py1 | $C_{10}H_{21}$ |
| 139 | $C_6H_{13}$ | — | — | Ph | Ph | C≡C | Cy | $C_3H_7$ |
| 140 | $C_9H_{19}$ | — | — | Ph | Ph | — | Cy | $C_4H_9$ |
| 141 | $C_7H_{15}O$ | — | — | Ph | Ph | — | Cy | $C_8H_{17}$ |
| 142 | $C_8H_{17}$ | — | — | Ph | Ph | — | Pr1 | $C_5H_{11}$ |
| 143 | $C_{10}H_{21}$ | — | — | Ph | Ph | $\overset{OC}{\underset{O}{\parallel}}$ | Ph | $C_{12}H_{25}$ |
| 144 | $C_5H_{11}O$ | — | — | Ph | Ph | $\overset{OC}{\underset{O}{\parallel}}$ | Tn | $C_2H_5$ |
| 145 | $C_{11}H_{23}$ | — | — | Ph | Ph | $CH_2O$ | Ph | $\underset{*}{OCH_2\overset{F}{\underset{|}{C}}HC_3H_7}$ |
| 146 | $C_8H_{17}$ | — | — | Ph | Ph | $OCH_2$ | Cy | $C_6H_{13}$ |
| 147 | $C_4F_9O(CF_2)_2OCF_2CH_2O$ | — | — | Ph | Ph | $CH_2CH_2$ | Ph | $OC_7H_{15}$ |
| 148 | $C_4H_9$ | — | — | Ph | Ph | $\overset{CO}{\underset{O}{\parallel}}$ | Ph | $C_8H_{17}$ |
| 149 | $C_7H_{15}$ | — | — | Ph | Ph | — | Ph2F | $OCH_2C_3F_7$ |
| 150 | $C_8H_{17}O$ | — | — | Ph | Cy | — | Ph | $C_6H_{13}$ |

TABLE 1-continued

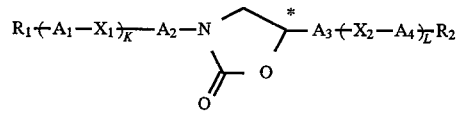

| No. | R₁ | A₁ | X₁ | A₂ | A₃ | X₂ | A₄ | R₂ |
|---|---|---|---|---|---|---|---|---|
| 151 | $C_6H_{13}$ | — | — | Ph | Cy | — | Ph | $C_{10}H_{21}$ |
| 152 | $C_{10}H_{21}O$ | — | — | Ph | Cy | — | Cy | $C_3H_7$ |
| 153 | $C_{10}H_{21}$ | — | — | Ph | Np | — | Pr1 | $C_8H_{17}$ |
| 154 | $C_8H_{17}$ | — | — | Ph | Np | $OCH_2$ | Ph | $C_5H_{11}$ |
| 155 | $C_7H_{15}O$ | — | — | Ph | Np | $\underset{O}{\overset{O}{\underset{\parallel}{OC}}}$ | Cy | $C_3H_7$ |
| 156 | $C_6H_{13}$ | — | — | Ph | Py1 | $\underset{O}{\overset{}{\underset{\parallel}{OC}}}$ | Cy | $C_6H_{13}$ |
| 157 | $C_9H_{19}O$ | — | — | Ph | Py1 | $OCH_2$ | Ph | $OCH_2La2(4,0)$ |
| 158 | $C_5H_{11}$ | — | — | Py2 | Ph | $CH_2CH_2$ | Cy | $C_4H_9$ |
| 159 | $C_8H_{17}$ | — | — | Py2 | Cy | $OCH_2$ | Ph | $C_8H_{17}$ |
| 160 | $C_7H_{15}$ | — | — | Pr1 | Ph | $\underset{O}{\overset{}{\underset{\parallel}{OC}}}$ | Cy | $C_6H_{13}$ |
| 161 | $C_{10}H_{21}O$ | — | — | Np | Ph | — | Cy | $C_3H_7$ |
| 162 | $C_{15}H_{31}$ | — | — | Np | Ph3F | $\underset{O}{\overset{}{\underset{\parallel}{OC}}}$ | Ph | $OC_9H_{19}$ |
| 163 | $C_4H_9$ | — | — | Np | Ph | $C\equiv C$ | Ph | $OCH_2C_6F_{13}$ |
| 164 | $\underset{O}{\overset{}{\underset{\parallel}{C_8H_{17}CO}}}$ | — | — | Np | Cy | — | Ph | $C_{10}H_{21}$ |
| 165 | $C_6H_{13}O$ | — | — | Np | Cy | $\underset{O}{\overset{}{\underset{\parallel}{OC}}}$ | Pr1 | $C_4H_9$ |
| 166 | $C_6H_{13}$ | Ph | — | Ph | Ph | — | — | $C_6H_{13}$ |
| 167 | $C_4F_9O(CF_2)_2OCF_2CH_2O$ | Ph | — | Ph | Ph | — | — | $OC_{10}H_{21}$ |
| 168 | $C_5H_{11}$ | Ph | — | Ph | Ph | — | — | $OCH_2Dp(1)$ |
| 169 | $C_6H_{13}$ | Ph | $CH_2CH_2$ | Ph | Ph | — | — | $OC_{11}H_{23}$ |
| 170 | $C_7H_{15}$ | Ph | $CH_2O$ | Ph | Ph | — | — | $OCH_2CF_2OC_2F_5$ |
| 171 | $C_{10}H_{21}$ | Ph | $\underset{O}{\overset{}{\underset{\parallel}{CO}}}$ | Ph | Ph | — | — | $C_7H_{15}$ |
| 172 | $C_{16}H_{33}O$ | Ph | $\underset{O}{\overset{}{\underset{\parallel}{CO}}}$ | Ph | Cy | — | — | $C_3H_7$ |
| 173 | $C_{13}H_{27}O$ | Ph | $\underset{O}{\overset{}{\underset{\parallel}{OC}}}$ | Ph | Ph | — | — | $C_4H_9$ |
| 174 | $C_9H_{19}$ | Ph | $C\equiv C$ | Ph | Cy | — | — | $C_6H_{13}$ |
| 175 | $C_2H_5$ | Tn | $\underset{O}{\overset{}{\underset{\parallel}{CO}}}$ | Ph | Ph | — | — | $C_9H_{19}$ |
| 176 | $C_8H_{17}$ | Ph | — | Ph | Cy | — | — | $C_5H_{11}$ |
| 177 | $C_{11}H_{23}O$ | Np | $\underset{O}{\overset{}{\underset{\parallel}{CO}}}$ | Ph | Cy | — | — | $C_8H_{17}$ |
| 178 | $C_6H_{13}$ | Py2 | — | Ph | Ph | — | — | $C_9H_{19}$ |
| 179 | $C_8H_{17}$ | Py2 | — | Ph | Ph | — | — | $(CH_2)_4La1(7,0)$ |
| 180 | $C_8F_{17}CH_2O$ | Py2 | — | Ph | Ph | — | — | $C_{10}H_{21}$ |
| 181 | $C_{10}H_{21}$ | Py2 | — | Ph | Ph | — | — | $OCH_2CF_2OC_2F_5$ |

TABLE 1-continued $$R_1\text{€}A_1-X_1)_{\overline{K}}-A_2-N\underset{O}{\overset{*}{\diagdown}}A_3\text{€}X_2-A_4)_{\overline{L}}R_2$$

| No. | R₁ | A₁ | X₁ | A₂ | A₃ | X₂ | A₄ | R₂ |
|-----|----|----|----|----|----|----|----|----|
| 182 | F–C₆H₁₃CH(CH₂)₂ * | Py2 | — | Ph | Ph | — | — | C₅H₁₁ |
| 183 | C₇H₁₅ | Py2 | — | Ph | Cy | — | — | C₅H₁₁ |
| 184 | C₁₁H₂₅ | Py2 | — | Ph | Cy | — | — | C₈H₁₇ |
| 185 | C₈H₁₇O | Py2 | — | Ph | Cy | — | — | C₃H₇ |
| 186 | C₉H₁₉ | Py2 | — | Ph | Ph | — | — | OCC₆H₁₃‖O |
| 187 | C₁₂H₂₅ | Py1 | — | Ph | Ph | — | — | C₇H₁₅ |
| 188 | C₈H₁₇ | Pr2 | — | Ph | Ph | — | — | C₆H₁₃ |
| 189 | C₄H₉ | Pr2 | — | Ph | Ph | — | — | CH₃–O(CH₂)₅CHC₂H₅ * |
| 190 | C₇H₁₅ | Pr2 | — | Ph | Cy | — | — | C₈H₁₇ |
| 191 | C₃H₇ | Cy | — | Ph | Ph | — | — | C₁₀H₂₁ |
| 192 | C₅H₁₁ | Cy | — | Ph | Ph | — | — | OCH₂C₁₀F₂₁ |
| 193 | C₆H₁₃ | Cy | — | Ph | Ph | — | — | OCC₄H₉‖O |
| 194 | C₁₀H₂₁ | Td | — | Ph | Cy | — | — | C₄H₉ |
| 195 | C₈H₁₇ | Tz1 | — | Ph | Ph | — | — | C₆H₁₃ |
| 196 | C₈H₁₇ | Ph | — | Ph | Ph | — | Ph | F–OCH₂CHC₅H₁₁ * |
| 197 | C₁₀H₂₁ | Py2 | — | Ph | Ph | — | Ph | OCH₂CF₂OC₂F₅ |
| 198 | C₅H₁₁ | Pr2 | — | Ph | Ph | — | Ph | OCC₇H₁₅‖O |
| 199 | C₆H₁₃ | Py2 | — | Ph3F | Cy | — | Ph | OCH₂CF₂OCF₂CF₂OC₄F₉ |
| 200 | C₄H₉ | Dx2 | — | Ph | Py2 | — | Ph | OCH₂La2(6,0) |
| 201 | C₈H₁₇ | — | — | Ph | Ph | — | — | CN |
| 202 | NC | — | — | Ph | Cy | — | — | C₃H₇ |
| 203 | C₇H₁₅O | — | — | Ph | Ph | — | — | C₆H₁₃ |
| 204 | C₈H₁₇CO‖O | — | — | Ph | Ph | — | — | C₆H₁₃ |
| 205 | CH₃O | — | — | Ph | Ph | — | — | C₆H₁₃ |
| 206 | H | — | — | Ph | Ph | — | — | C₉H₁₉ |
| 207 | C₂₅H₅₁ | — | — | Ph | Ph | — | — | C₁₁H₂₃ |
| 208 | C₅H₁₁ | — | — | Ph | Ph | — | — | F |
| 209 | C₄H₉ | — | — | Ph | Ph | — | — | C₂₀H₄₁ |
| 210 | C₁₀H₂₁ | — | — | Ph | Ph | — | — | —C≡C—C₅H₁₁ |
| 211 | C₈H₁₇ | — | — | (indane) | Ph | — | — | C₆H₁₃ |

TABLE 1-continued

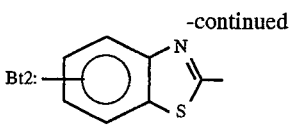

| No. | R₁ | A₁ | X₁ | A₂ | A₃ | X₂ | A₄ | R₂ |
|---|---|---|---|---|---|---|---|---|
| 212 | $C_{11}H_{23}$ | — | — | (benzofuran) | Ph | | | $-CH_2SC_3H_7$ |
| 213 | $C_{13}H_{27}$ | — | $-OCH_2-$ | Ph | Ph | | | $C_3H_7$ |

The liquid crystal composition according to the present invention may be obtained by mixing at least one species of the optically active compound represented by the formula (I) and at least one species, preferably 1–50 species, more preferably 1 –30 species, particularly 3–30 species, of another mesomorphic compound in an appropriate proportions.

The liquid crystal composition according to the present invention may preferably be formulated as a chiral smectic liquid crystal composition, particularly a ferroelectric chiral smectic liquid crystal composition.

Specific examples of another mesomorphic compound described above may include those described at pages 23–39 of (JP-A) 4-272989 as compounds represented by formulae (III) to (XII), preferably formulae (IIIa) to (XIId), more preferably (IIIaa) to (IXIIdb).

In the above mesomorphic compounds of the formulae (III) to (XII), (IIIa) to (XIId) and (IIIaa) to (XIIdb), at least one terminal group (i.e., $R_1'$ and/or $R_2'$, $R_3'$ and/or $R_4'$, or $R_5'$ and/or $R_6'$) may be the group: $(CH_2)_E C_G F_{2G+1}$ in which E is an integer of 0 –10 and G is an integer of 1–15.

In the present invention, mesomorphic compounds represented by the following formulae (XIII) to (XVIII) may also be used as another mesomorphic compound.

Specific examples of another mesomorphic compound may also include those represented by the following formulae (XIII) to (XVIII) including abbreviations for respective cyclic groups listed below in addition to those described above.

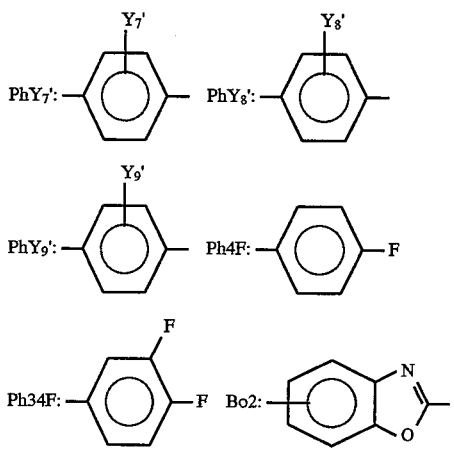

-continued

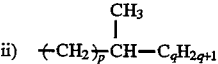

| | |
|---|---|
| $R_7'-X_6'-(Py2)-X_7'-(Ph)-X_8'-(PhY_7')_N-(Tn)-R_8'$ | (XIII) |
| $R_7'-X_6'-(Py2)-(Ph)-OCO-(Ph4F)$ | (XIV) |
| $R_7'-X_6'-(Py2)-(Ph)-OCO-(Ph34F)$ | (XV) |
| $R_7'-(PhY_7')_Q-(Tz1)-(PhY_8')-X_7'-(PhY_9')_R-(Cy)_T-X_9'-R_8'$ | (XVI) |
| $R_7'-(Bo2)-A_4'-X_9'-R_8'$ | (XVII) |
| $R_7'-(Bt2)-A_4'-X_9'-R_8'$ | (XVIII) |

Herein, $R_7'$ and $R_8'$ respectively denote hydrogen or a linear or branched alkyl group having 1 –18 carbon atoms capable of including one or non-neighboring two or more methylene groups except for those directly connected to $X_6'$ and $X_9'$, which methylene group can be replaced with —O—, —CO—, —OCO—, —COO—, —CH(CN)— or —CCH₃(CN)—.

Further, preferred examples of $R_7'$ and $R_8'$ may respectively include those represented by the following groups (i) to (viii):

i) a linear alkyl group having 1–15 carbon atoms ii) $+CH_2 \}_p CH-C_qH_{2q+1}$ with $CH_3$ branch wherein p denotes an integer of 0–5 and q denotes an integer of 2–11 (optically active or inactive);

iii) 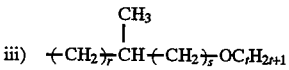

wherein r denotes an integer of 0–6, s denotes 0 or 1, and t denotes an integer of 1–14 (optically active or inactive);

iv) $-\underset{\underset{O}{\|}}{\overset{\overset{CH_3}{|}}{C}H}COC_wH_{2w+1}$ wherein w denotes an integer of 1–15 (optically active or inactive);

v) $+CH_2\overset{}{\underset{A}{)}}-\overset{\overset{CN}{|}}{C}H-C_BH_{2B+1}$ wherein A denotes an integer of 0–2 and B denotes an integer of 1–15 (optically active or inactive);

vi) $+CH_2\overset{}{\underset{C}{)}}-\overset{\overset{CN}{|}}{\underset{\underset{CH_3}{|}}{C}}-C_DH_{2D+1}$ wherein C denotes an integer of 0–2 and D denotes an integer of 1–15 (optically active or inactive);

vii) $+CH_2\overset{}{\underset{E}{)}}-C_GF_{2G+1}$ wherein E is an integer of 0–10 and G is an integer of 1–15; and viii) H (hydrogen).

In the above formulae (XIII) to (XVIII); N, Q, R and T are 0 or 1; $Y_7'$, $Y_8'$ and $Y_9'$ are H or F; $A_4'$ is Ph or Np; $X_6'$ and $X_9'$ respectively denote a single bond, —COO—, —OCO— or —O—; and $X_7'$ and $X_8'$ respectively denote a single bond, —COO—, —OCO—, —CH$_2$O— or —OCH$_2$—.

The compound of the formula (XIII) may preferably include a compound represented by the following formula (XIIIa):

$R_7'-X_6'-(Py2)-(Ph)-OCO-(Tn)-R_8'$      (XIIIa).

The compound of the formula (XVI) may preferably include compounds represented by the following formulae (XVIa) and (XVIb):

$R_7'-(Tz1)-(Ph)-X_9'-R_8'$      (XVIa), and $R_7'-(PhY_7')-(Tz1)-(PhY_8')-X_9'-R_8'$      (XVIb).

The compound of the formula (XVII) may preferably include compounds represented by the following formulae (XVIIa) and (XVIIb):

$R_7'-(Boa2)-(Ph)-O-R_8'$      (XVIIa), and $R_7'-(Boa2)-(Np)-O-R_8'$      (XVIIb).

The compounds of the formula (XVIII) and may preferably include compounds represented by the following formulae (XVIIIa) to (XVIIIc):

$R_7'-(Btb2)-(Ph)-R_8'$      (XVIIIa), $R_7'-(Btb2)-(Ph)-O-R_8'$      (XVIIIb), and $R_7'-(Btb2)-(Np)-O-R_8'$      (XVIIIc).

The compounds of the formula (XVIa) and (XVIb) may preferably include compounds represented by the following formulae (XVIaa) to (XVIbc):

$R_7'-(Tz1)-(Ph)-O-R_8'$      (XVIaa), $R_7'-(Ph)-(Tz1)-(Ph)-R_8'$      (XVIba), $R_7'-(Ph)-(Tz1)-(Ph)-O-R_8'$      (XVIbb), and $R_7'-(Ph)-(Tz1)-(Ph)-OCO-R_8'$      (XVIbc).

In formulating the liquid crystal composition according to the present invention by using at least one species of the optically active compound of the formula (I), the liquid crystal composition may desirably contain 1–80 wt. % of an optically active compound represented by the formula (I) in view of improvements in various properties including a temperature range of a mesomorphic phase, responsiveness, contrast and uniform switching characteristics so as to provide a practical liquid crystal device, particularly a (ferroelectric) chiral smectic liquid crystal device. Further, in view of properties of another mesomorphic compound in addition to the above properties, the liquid crystal composition according to the present invention may more preferably contain 1–60 wt. %, particularly 1–40 wt. %, of a mesomorphic compound of the formula (I). If the content of the mesomorphic compound of the formula (I) is below 1 wt. %, improvement effects (e.g., response characteristics) given by the optically active compound of the formula (I) become too small in many cases.

Similarly, when two or more species of the optically active compounds represented by the formula (I) are used, the liquid crystal composition may desirably contain 1–80 wt. %, preferably 1–60 wt. %, more preferably 1–40 wt. %, of the two or more species of optically active compounds represented by the formula (I) in view of the above-mentioned properties and effects.

The liquid crystal device according to the present invention may preferably be prepared by heating the liquid crystal composition containing the optically active compound of the formula (I) as prepared above into an isotropic liquid under vacuum, filling a blank cell comprising a pair of oppositely spaced electrode plates with the composition, gradually cooling the cell to form a (chiral smectic) liquid crystal layer and restoring the normal pressure.

FIG. 1 is a schematic sectional view of an embodiment of a liquid crystal device having a chiral smectic liquid crystal layer, particularly a ferroelectric liquid crystal device, according to the invention for explanation of the structure thereof Referring to FIG. 1, the liquid crystal device includes a liquid crystal layer 1 assuming a chiral smectic phase disposed between a pair of glass substrates 2 each having thereon a transparent electrode 3 and an insulating alignment control layer 4. In the present invention, the transparent electrode 3 or the alignment control layer 4 may be formed on one of the substrates 2 or the transparent electrode 3 respectively. The glass substrates 2 are placed or arranged opposite each other. Lead wires (not shown) are connected to the electrodes so as to apply a driving voltage to the liquid crystal layer 1 from a power supply (not shown). Outside the substrates 2, a pair of polarizers 6 are disposed so as to modulate incident light $I_0$ from a light source 7 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to uniaxially align the liquid crystal molecules in the rubbing direction (uniaxial alignment treatment). Further, it is also possible to compose the alignment control layer 4 of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin, or photoresist resin. Alternatively, it is also possible to use a single layer of inorganic insulating alignment control layer comprising the above-mentioned inorganic material or organic insulating alignment control layer comprising the above-mentioned organic material. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The insulating alignment control layer 4 may have a thickness of ordinarily 1 nm–1 micron, preferably 1 nm–300 nm, further preferably 1 nm–100 nm. The two glass substrates 2 with transparent electrodes 3 (which may be inclusively referred to herein as "electrode plates") and further with insulating alignment control layers 4 thereof are held to have a prescribed (but arbitrary) gap with a spacer (not shown). For example, such a cell structure with a prescribed gap may be formed by sandwiching spacers of silica beads or alumina beads having a prescribed diameter with two glass plates, and then sealing the periphery thereof with, a sealing material 5 comprising, e.g., an epoxy adhesive. Alternatively, a polymer film or glass fiber may also be used as a spacer. Between the two glass plates, a liquid crystal composition assuming a chiral smectic phase (e.g., a ferroelectric liquid crystal composition) is sealed up to provide a liquid crystal layer 1 in a thickness of generally 0.5 to 20 µm, preferably 1 to 5 µm.

The transparent electrodes 3 are connected to the external power supply (not shown) through the lead wires (not shown). Further, outside the glass substrates 2, a pair of polarizers 7 arranged in, e.g., right angle cross nicol relationship are applied. The device shown in FIG. 1 is of a transmission type and accordingly is provided with a light source 8 at the back of one of the polarizers 7.

Figure 2:
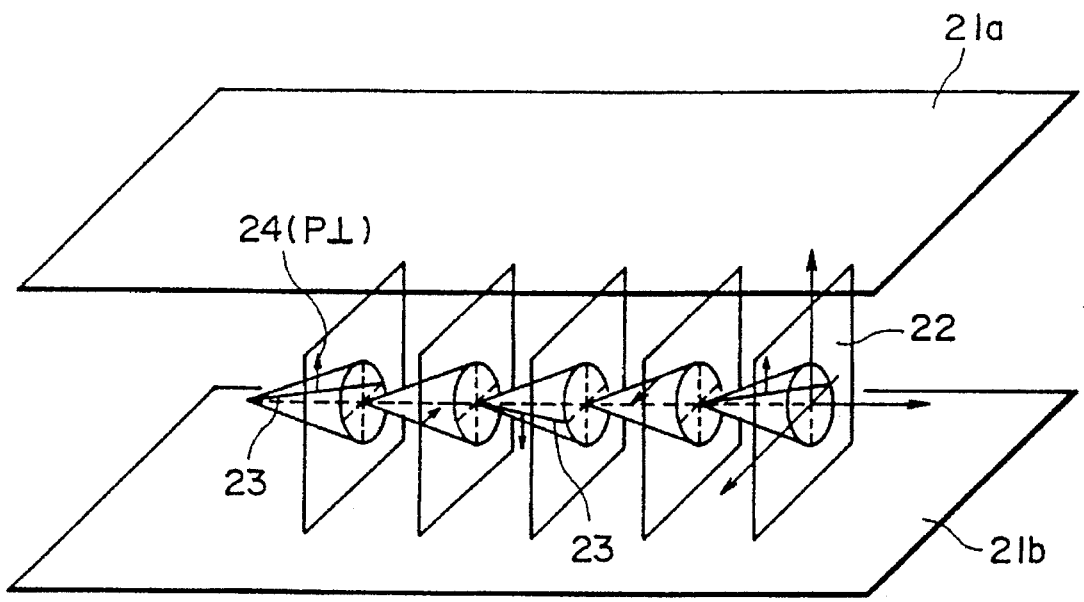
FIGS. 2 and 3 are schematic perspective views of a device cell embodiment for illustrating the operation principle of a liquid crystal device utilizing ferroelectricity of a liquid crystal composition.

FIG. 2 is a schematic illustration of a liquid crystal cell (device) utilizing ferroelectricity for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecule 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
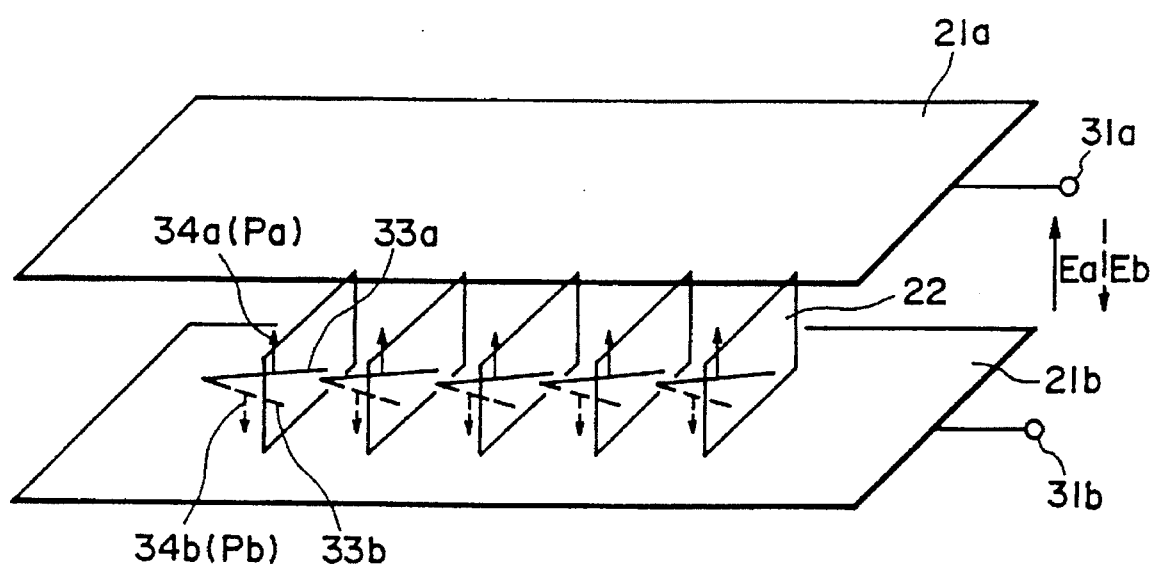
Figure 4:
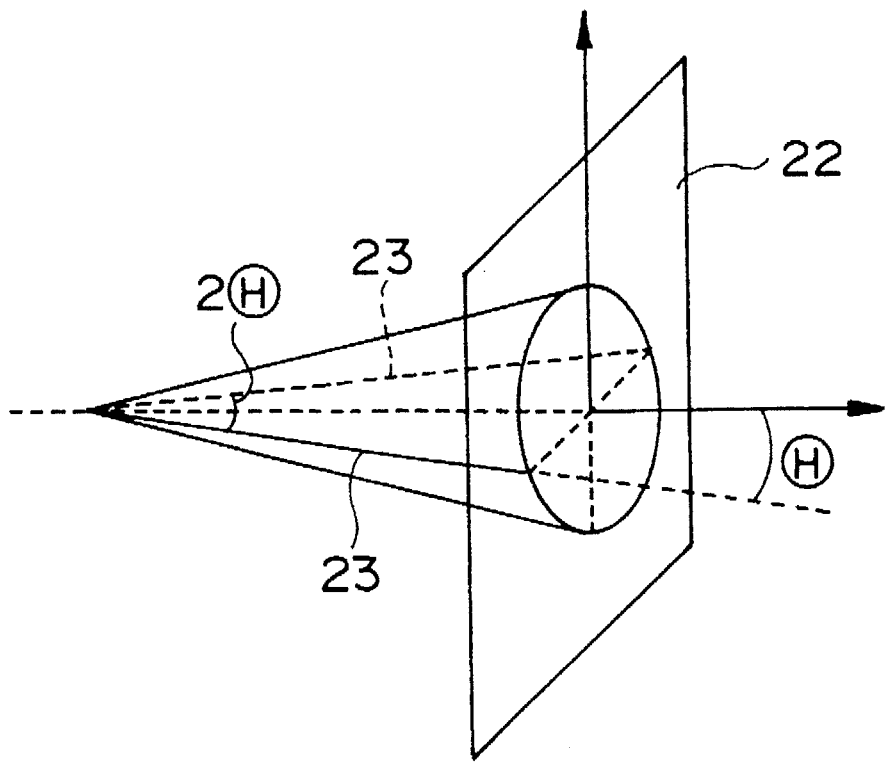
FIG. 4 is a schematic view for illustrating a tilt angle $\textcircled{H}$ in a ferroelectric liquid crystal with a helical structure.

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by using voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Figure 5B:
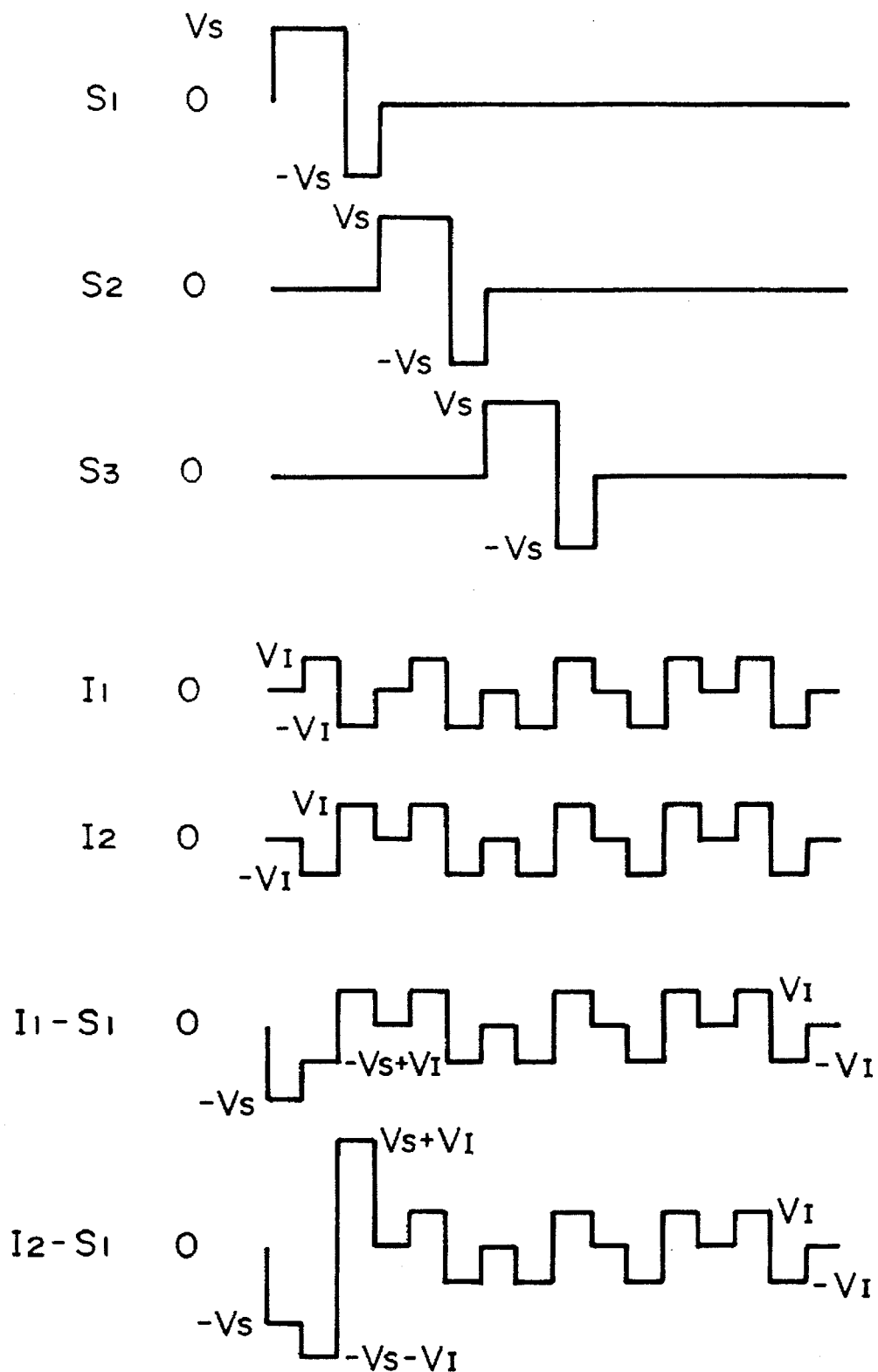
FIG. 5B is time-serial waveforms comprising a succession of such unit waveforms.

FIGS. 5A and 5B are waveform diagrams showing driving voltage waveforms adopted in driving a ferroelectric liquid crystal panel as an embodiment of the liquid crystal device according to the present invention.

Referring to FIG. 5A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform (providing a white display state) applied to a non-selected data line. Further, at $(I_S\text{-}S_S)$ and $(I_N\text{-}S_S)$ in the figure are shown voltage waveforms applied to pixels on a selected scanning line, whereby a pixel supplied with the voltage $(I_S\text{-}S_S)$ assumes a black display state and a pixel supplied with the voltage $(I_N\text{-}S_S)$ assumes a white display state. FIG. 5B shows a time-serial waveform used for providing a display state as shown in FIG. 6.

In the driving waveforms shown in FIGS. 5A and 5B, a minimum duration $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 5A and 5B are determined depending on switching characteristics of a ferroelectric liquid crystal material used. In this embodiment, the parameters are fixed at a constant value of a bias ratio $V_I/(V_I+V_S)=\frac{1}{3}$. It is of course possible to increase a range of a driving voltage allowing an appropriate matrix drive by increasing the bias ratio. However, a large bias ratio corresponds to a large amplitude of a data signal and leads to an increase in flickering and a lower contrast, thus being undesirable in respect of image quality. According to our study, a bias ratio of about $\frac{1}{3}-\frac{1}{4}$ was practical.

The liquid crystal device according to the present invention is used as an element, particularly a display element, for various liquid crystal apparatus.

Figure 7:
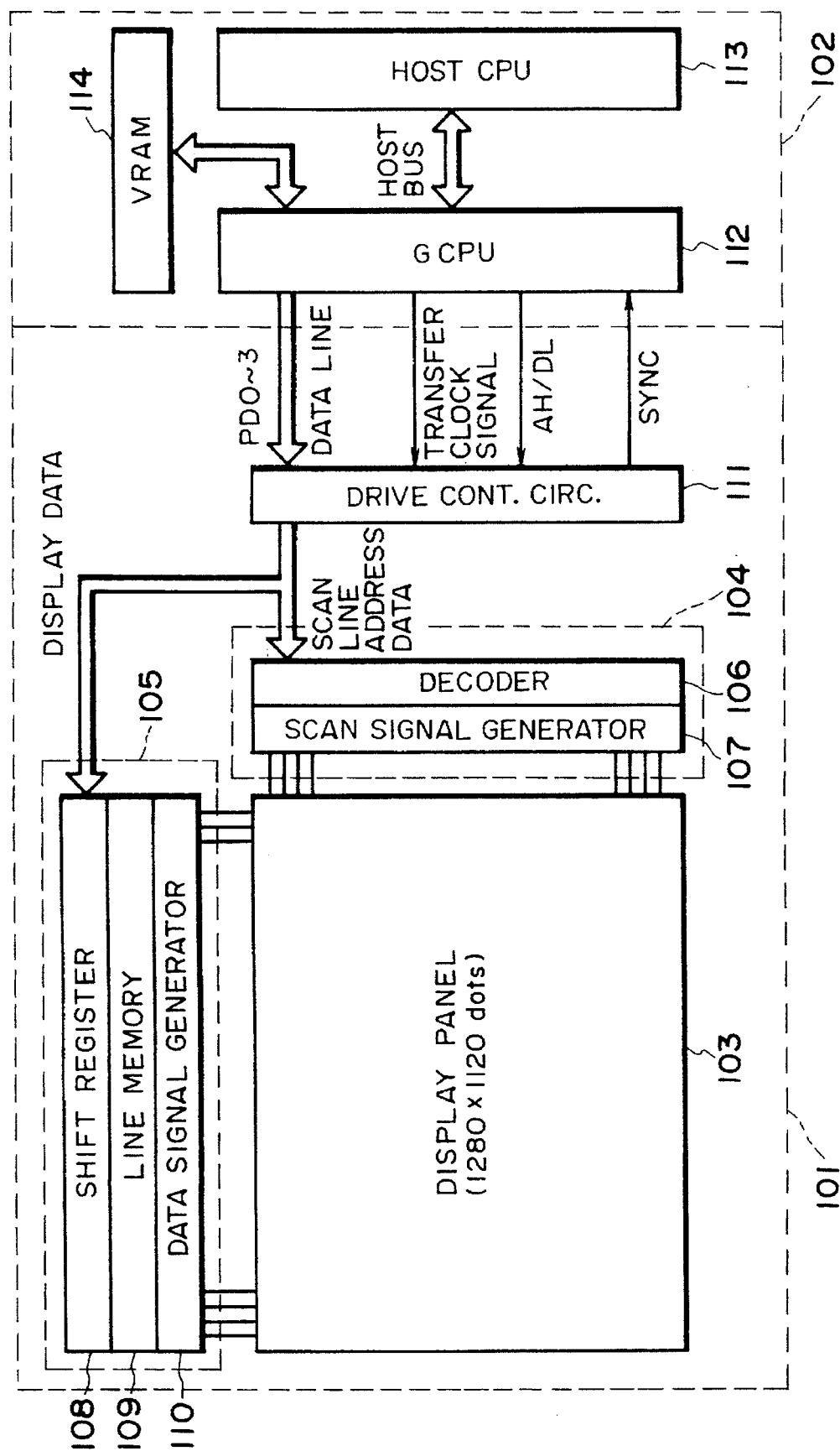
FIG. 7 is a block diagram showing a display apparatus comprising a liquid crystal device utilizing ferroelectricity of a liquid crystal composition and a graphic controller.
Figure 8:
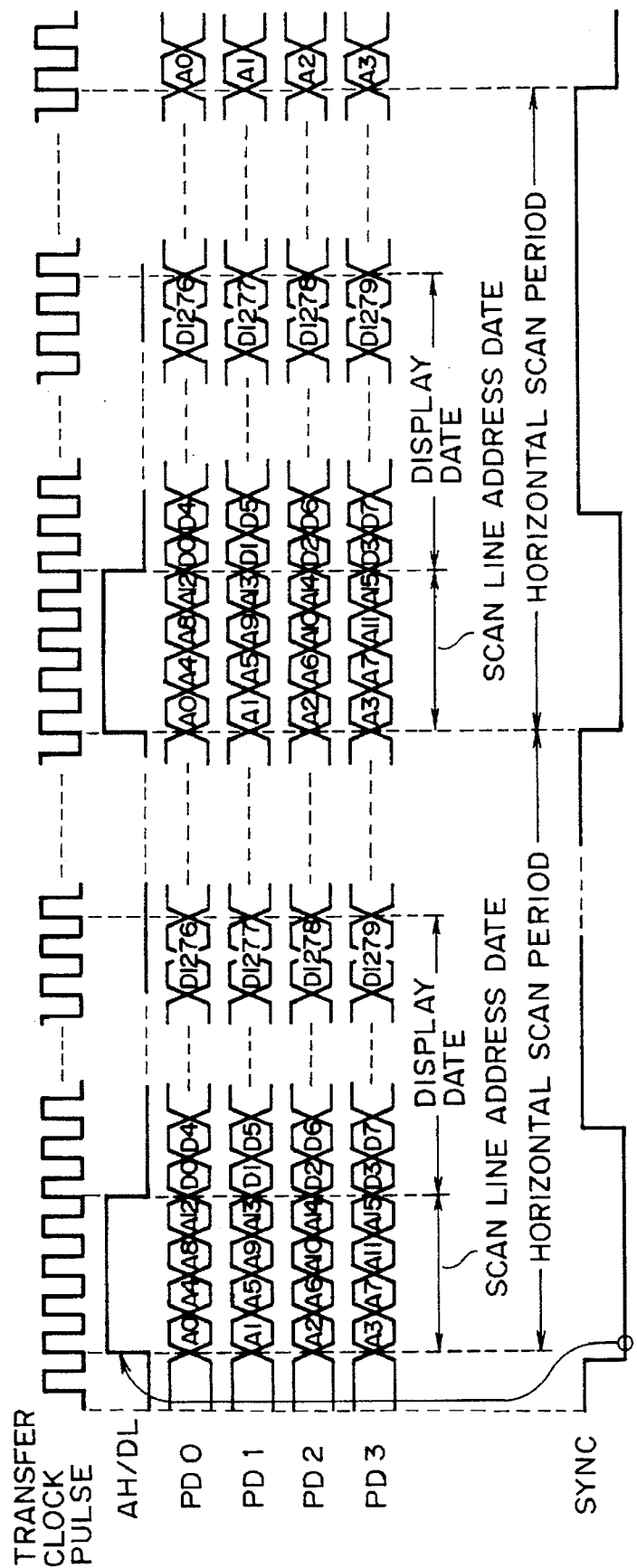
FIG. 8 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 7 and 8, there is provided a liquid crystal display apparatus of the present invention which uses the liquid crystal device according to the present invention as a display panel portion.

Referring to FIG. 7, the liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed at the back of the display panel 103.

Hereinbelow, the present invention will be explained more specifically with reference to examples. It is however to be understood that the present invention is not restricted to these examples.

EXAMPLE 1

Production of (5R)-3-(4-methoxyphenyl)-5-phenyl-2-oxazolidinone (Example Compound No. 8)

3.50 g (29.1 mM) of (R)-(+)-styrene oxide, 0.035 g of lithium chloride and 14 ml of N,N-dimethylformamide (DMF) were placed in a 50 ml-three necked flask. Under refluxing and stirring in nitrogen atmosphere, a solution of 4.38 g (29.4 mM) of 4-methoxyphenyl isocyanate in 3.5 ml of DMF was added dropwise to the mixture in 40 minutes, followed by refluxing for 40 minutes under stirring. After the reaction, the reaction mixture was poured into ice water to precipitate a crystal. The crystal was recovered by filtration, washed with water and recrystallized from methanol. The resultant crystal was purified by silica gel column chromatography (eluent: toluene/ethyl acetate =100/1) and recrystallized from a toluene/methanol mixture solvent to obtain 4.22 g of (5R)-3-(4-methoxyphenyl)-5-phenyl-2-oxazolidinone (Yield: 53.8%). This compound showed the following phase transition series.

Phase transition temperature (° C.)

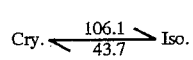

Hereinbelow, the respective symbols denote the following phases; Iso.: isotropic phase; Sm: smectic phase (unidentified); and Cry.: crystal.

EXAMPLE 2

Production of (5R)-3-(4-octyloxyphenyl)-5-phenyl-2-oxazolidinone (Ex. Comp. No. 20)

4.10 g (15.2 mM) of (5R)-3-(4-methoxyphenyl)-5-phenyl-2-oxazolidinone synthesized in Example 1 was dissolved in 100 ml of methylene chloride and cooled to −75° to 70° C. on a dry ice-acetone cooling bath. To the solution, 31.5 ml of 1.0M-solution of boron tribromide in methylene chloride was added dropwise in 43 minutes, followed by stirring for 1 hour at −75° to −70° C. and further stirring for 2 hours at room temperature. After the reaction, the reaction mixture was poured into ice water and subjected to extraction with ethyl acetate. The organic layer was washed with water and dried with anhydrous sodium sulfate, followed by evaporation under reduced pressure to obtain a residue. To the residue, an appropriate amount of hexane was added to precipitate a crystal. The crystal was recovered by filtration, thus obtaining 3.13 g of (5R)-3-(4-hydroxyphenyl)-5-phenyl-2-oxazolidinone (Yield: 80.5%).

Then, 0.30 g (1.18 mM) of (5R)-3-(4-hydroxyphenyl)-5-phenyl-2-oxazolidinone and 4.6 ml of DMF were placed in 30 ml-round bottomed flask, followed by stirring to form a solution. To the solution, 0.053 g (1.33 mM) of 60%-oily sodium hydride was added under stirring at room temperature. After the settlement of foaming, 0.25 ml (1.38 mM) of 1-iodooctane was added to the mixture, followed by stirring for 30 minutes on an oil bath kept at about 70° C. After the reaction, the reaction mixture was poured into ice water to precipitate a crystal. The crystal was recovered by filtration and washed with water, followed by purification by silica gel column chromatography (eluent: toluene/ethyl acetate =100/1) and recrystallization from a toluene-methanol mixture solvent to obtain 0.13 g of (5R)-3-(4-octyloxyphenyl)-5-phenyl-2-oxazolidinone (Yield: 30.1%).

Phase transition temperature (° C.)

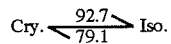

EXAMPLE 3

Production of (5R)-3-(4-bromophenyl)-5-phenyl-2-oxazolidinone (Ex. Comp. No. 31)

(5R)-3-(4-bromophenyl)-5-phenyl-2-oxazolidinone was synthesized in the same manner as in Example 1 except that 4-bromophenyl isocyanate was used instead of 4-methoxyphenyl isocyanate used in Example 1 (Yield: 35.5%).

Phase transition temperature (° C.)

$$Cry. \underset{71.4}{\overset{112.4}{\rightleftarrows}} Iso.$$

EXAMPLE 4

Production of (5R)-3-(4-octylphenyl)-5-phenyl-2-oxazolidinone (Ex. Comp. No. 46)

0.40 g (3.56 mM) of 1-octene and 2 ml of dry tetrahydrofuran (THF) were placed in 50 ml-three necked flask. To the mixture, 7.6 ml of 0.5M-9-borabicyclo[3.3.1]-nonane-(9-BBN) in THF was gradually added dropwise on an ice-common salt bath at −15° to −13° C. (inner temperature) in nitrogen atmosphere, followed by stirring for 1 hour at the same temperature and further stirring for 2 hours at about 10° C. To the resultant mixture, a solution of 0.80 g (2.51 mM) of (5R)-3-(4-bromophenyl)-5-phenyl-2-oxazolidinone synthesized in Example 3 in 11 ml of DMF was added under cooling on an ice bath, followed by addition of 0.08 g of tetrakis (triphenylphosphine) palladium (O) and 0.70 g of potassium carbonate in succession and then stirring for 3 hours at 63.5°–70 ° C. (inner temperature). After the reaction, the reaction mixture was poured into ice water to precipitate a crystal. The crystal was recovered by filtration and washed with water, followed by purification by silica gel column chromatography (eluent: hexane/ethyl acetate=4/1) and recrystallization from acetone to obtain 0.15 g of (5R)-3-(4-octylphenyl)-5-phenyl-2-oxazolidinone (Yield: 17.0%).

Phase transition temperature (° C.)

$$Cry. \underset{69.0}{\overset{76.8}{\rightleftarrows}} Iso.$$

EXAMPLE 5

Production of (5R)-3-(4-hexanoyloxyphenyl)-5-phenyl-2-oxazolidinone (Ex. Comp. No. 59)

0.50 g (1.96 mM) of (5R)-3-(4-hydroxyphenyl)-5-phenyl-2-oxazolidinone synthesized in Example 2, 0.26 g of hexanoic acid and 20 ml of methylene chloride were placed in 50 ml-round bottomed flask, followed by stirring to form a solution. To the solution, 0.43 g (2.08 mM) of N,N'-dicyclohexylcarbodiimide and 0.10 g of 4-dimethylaminopyridine were added in succession, followed by stirring for 8 hours at room temperature. The precipitated N,N'-dicyclohexylurea was filtered out and the filtrate was evaporated under reduced pressure to obtain a residue. The residue was purified by silica gel column chromatography (eluent: toluene/ethyl acetate=20/1) and recrystallized from methanol to obtain 0.36 g of (5R)-3-(4-hexanoyloxyphenyl)-5-phenyl-2-oxazolidinone (Yield: 52.0%).

Phase transition temperature $$Cry. \underset{0>}{\overset{78.1}{\rightleftarrows}} Iso.$$

EXAMPLE 6

Production of (5R)-3-[4-(2-fluorodecyloxy)phenyl]-5-phenyl-2-oxazolidinone (Ex. Comp. No. 66)

(5R)-3-[4-(2-fluorodecyloxy)phenyl]-5-phenyl-2-oxazolidinone was synthesized in the same manner as in Example 2 except that optically active 2-fluorodecyl p-toluenesulfonate was used instead of 1-iodooctane used in Example 2 (Yield: 58.0%).

Phase transition temperature (° C.)

$$Cry. \underset{70.8}{\overset{91.7}{\rightleftarrows}} Iso.$$

EXAMPLE 7

Production of optically active 3-(4-butylphenyl)-5-(4-methoxyphenyl)-2-oxazolidinone (Ex. Comp. No. 90)

In a 20 ml-three necked flask, 0.013 g of lithium chloride and 3.8 ml of DMF were placed. To the mixture, a solution of 1.09 g (6.22 mM) of 4-butylphenyl isocyanate and 6.20 mM of optically active 4-methoxystyrene oxide in 1.3 ml of DMF was added dropwise in 12 minutes under refluxing and stirring in nitrogen atmosphere, followed by refluxing for 50 minutes under stirring. After the reaction, the reaction mixture was left standing for cooling, then poured into water, and subjected to extraction with ethyl acetate. The organic layer was washed with water, dried with anhydrous sodium sulfate and evaporated under reduced pressure to obtain a residue The residue was purified by silica gel column chromatography (eluent: toluene/ethyl acetate=10/1) and recrystallized from methanol to obtain 0.29 g of optically active 3-(4-butylphenyl)-5-(4-methoxyphenyl)-2-oxazolidinone (Yield: 14.5%).

Phase transition temperature (° C.)

$$Cry. \underset{70.8}{\overset{91.7}{\rightleftarrows}} Iso.$$

EXAMPLE 8

Production of optically active 3-(4-butylphenyl)-5-(4-octyloxyphenyl)-2-oxazolidinone (Ex. Comp. No. 105)

Optically active 3-(4-butylphenyl)-5-(4-octyloxyphenyl)-2-oxazolidinone was synthesized in the same manner as in Example 2 except for using 3-(4-butylphenyl)-5-(4-hydroxyphenyl)-2-oxazolidinone obtained through optically active 3-(4-butylphenyl)-5-(4-methoxyphenyl)-2-oxazolidinone synthesized in Example 7.

Phase transition temperature (° C.)

$$Cry. \underset{56.6}{\overset{90.7}{\rightleftarrows}} Iso.$$

EXAMPLE 9

Production of optically active 3-(4-methoxyphenyl)-5-(4-methoxyphenyl)-2-oxazolidinone (Ex. Comp. No. 126)

Optically active 3-(4-methoxyphenyl)-5-(4-methoxyphenyl)-2-oxazolidinone was synthesized in the same manner as in Example 7 except that optically active 4-methoxyphenyl isocyanate was used instead of 4-butylphenyl isocyanate used in Example 7.

Phase transition temperature (° C.)

$$Cry. \underset{64.6}{\overset{101.7}{\rightleftarrows}} Iso.$$

EXAMPLE 10

A liquid crystal composition A was prepared by mixing the following compounds in the indicated proportions.

| Structural formula | wt. parts |
|---|---|
| $C_5H_{19}$—Py2—Ph—$OC_9H_{19}$ | 6 |
| $C_{10}H_{21}$—Py2—Ph—$OC_8H_{17}$ | 6 |
| $C_8H_{17}O$—Pr1—Ph—$O(CH_2)_3$*$CH(CH_3)C_2H_5$ | 7 |
| $C_{11}H_{23}O$—Py2—Ph—$O(CH_2)_2$*$CH(CH_3)C_2H_5$ | 14 |
| $C_{10}H_{21}$—Pr2—Ph—$C_6H_{13}$ | 8 |
| $C_6H_{13}$—Py2—Ph—Ph—$CH_9$ | 4 |
| $C_8H_{17}$—Ph—Pr2—Ph—$OC_5H_{11}$ | 2 |
| $C_3H_7$—Cy—COO—Ph—Py1—$C_{12}H_{25}$ | 10 |
| $C_5H_{11}$—Cy—COO—Ph—Py1—$C_{12}H_{25}$ | 5 |
| $C_{10}H_{21}O$—Ph—COS—Ph—$OC_8H_{17}$ | 10 |
| $C_6H_{13}$—Ph—COO—Ph—Ph—$OCH_2CH(CH_3)C_2H_5$ | 7 |
| $C_3H_7$—Cy—$CH_2O$—Ph—Py1—$C_8H_{17}$ | 7 |
| $C_{10}H_{21}$—Ph—Ph—$OCH_2$—Ph—$C_7H_{15}$ | 5 |
| $C_{12}H_{25}$—Py2—Ph—$OCH_2$*$CH(F)C_6H_{11}$ | 2 |
| $C_5H_{11}$—Cy—COO—Ph—$OCH_2$*$CH(F)C_6H_{13}$ | 2 |
| $C_{12}H_{25}O$—Ph—Pa—$COO(CH_2)_3$*$CH(CH_3)C_2H_5$ | 2 |
| $C_{12}H_{25}O$—Ph—Pa—$O(CH_2)_3$*$CH(CH_3)OC_3H_7$ | 3 |

The liquid crystal composition A was further mixed with the following example compounds in the indicated proportions to provide a liquid crystal composition B.

| Ex. Comp. No. | wt. parts |
|---|---|
| 3 | 5 |
| 22 | 1 |
| 78 | 1 |
| Composition A | 96 |

Two 0.7 mm-thick glass plates were provided and respectively coated with an ITO film to form an electrode for voltage application, which was further coated with an insulating layer of vapor-deposited $SiO_2$. On the insulating layer, a 0.2%-solution of silane coupling agent (KBM-602, available from Shinetsu Kagaku K.K.) in isopropyl alcohol was applied by spinner coating at a speed of 2000 rpm for 15 seconds and subjected to hot curing treatment at 120 ° C. for 20 min.

Further, each glass plate provided with an ITO film and treated in the above described manner was coated with a 1.5%-solution of polyimide resin precursor (SP-510, available from Toray K.K.) in dimethylacetoamide by a spinner coater rotating at 2000 rpm for 15 seconds. Thereafter, the coating film was subjected to heat curing at 300° C. for 60 min. to obtain about 25 nm-thick film. The coating film was rubbed with acetate fiber-planted cloth. The thus treated two glass plates were washed with isopropyl alcohol. After silica beads with an average particle size of 2.0 microns were dispersed on one of the glass plates, the two glass plates were applied to each other with a bonding sealing agent (Lixon Bond, available from Chisso K.K.) so that their rubbed directions were parallel to each other and heated at 100° C. for 60 min. to form a blank cell.

Then, the liquid crystal composition B prepared above was heated into an isotropic liquid, and injected into the above prepared cell under vacuum and, after sealing, was gradually cooled to 25° C. at a rate of 20° C./hour to prepare a liquid crystal device (ferroelectric liquid crystal device). The cell gap was found to be about 2 microns as measured by a Berek compensator.

The liquid crystal device was subjected to measurement of an optical response time (time from voltage application until the transmittance change reaches 90% of the maximum under the application of a peak-to-peak voltage Vpp of 20 V in combination with right-angle cross-nicol polarizers), evaluation of a temperature-dependence of response time (i.e., a ratio of a response time at low temperature to a response time at high temperature) and observation of switching states. In the device, a monodomain with a good and uniform alignment characteristic was observed. The results of the measurement are shown below.

| | 10° C. | 25° C. | 40° C. |
|---|---|---|---|
| Response time (μsec) | 412 | 221 | 128 |
| Ratio (10° C./40° C.) | 3.2 | | |

Comparative Example 1

A liquid crystal device was prepared and subjected to measurement of response time and evaluation of a temperature-dependence of response time in the same manner as in Example 10 except for injecting the composition A alone used in Example 10 into a blank cell, whereby the following results were obtained.

| | 10° C. | 25° C. | 40° C. |
|---|---|---|---|
| Response time (μsec) | 668 | 340 | 182 |
| Ratio (10° C./40° C.) | 3.7 | | |

EXAMPLE 11

A liquid crystal composition C was prepared by mixing the following Example Compounds instead of those used in Example 10 in the indicated proportions with the liquid crystal composition A.

| Ex. Comp. No. | wt. parts |
|---|---|
| 51 | 2 |
| 68 | 2 |
| 183 | 1 |
| Composition A | 95 |

A liquid crystal device was prepared in the same manner as in Example 10 except that the above liquid crystal composition C was used, and the device was subjected to measurement of optical response time, evaluation of a temperature-dependence of response time and observation of switching states. In the device, a monodomain with a good and uniform alignment characteristic was observed. The results of the measurement and evaluation are shown below.

| | 10° C. | 25° C. | 40° C. |
|---|---|---|---|
| Response time (μsec) | 367 | 191 | 109 |
| Ratio (10° C./40° C.) | 3.4 | | |

EXAMPLE 12

A liquid crystal composition D was prepared by mixing the following Example Compounds instead of those used in Example 11 in the indicated proportions with the liquid crystal composition A.

| Ex. Comp. No. | wt. parts |
| --- | --- |
| 43 | 1 |
| 88 | 1 |
| 110 | 2 |
| Composition A | 96 |

A liquid crystal device was prepared in the same manner as in Example 10 except that the above liquid crystal composition D was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
| --- | --- | --- | --- |
| Response time (μsec) | 403 | 216 | 123 |
| Ratio (10° C./40° C.) | 3.3 | | |

EXAMPLE 13

A liquid crystal composition E was prepared by mixing the following compounds in the indicated proportions.

| Structural formula | wt. parts |
| --- | --- |
| $C_7H_{15}$—Py2—Ph—$OC_9H_{19}$ | 12 |
| $C_{11}H_{23}$—Py2—Ph—$OC_6H_{13}$ | 10 |
| $C_8H_{17}$—Pr2—Ph—$O(CH_2)_5(CH(CH_3)C_2H_6$ | 10 |
| $C_{10}H_{21}$—Py2—Ph—$O(CH_2)_4CH(CH_3)OCH_3$ | 3 |
| $C_8H_{17}$—Py2—Ph—Ph—$OC_6H_{13}$ | 8 |
| $C_6H_{13}O$—Ph—OCO—Np—$OC_9H_{19}$ | 4 |
| $C_3H_7$—Cy—COO—Ph—Py1—$C_{11}H_{23}$ | 6 |
| $C_8H_{17}$—Cy—COO—Ph—Py1—$C_{11}H_{23}$ | 2 |
| $C_5H_{11}$—Cy—COO—Ph—Py1—$C_{11}H_{23}$ | 8 |
| $C_{10}H_{21}O$—Ph—COO—Ph—$OCH_2$*$CH(CH_3)C_2H_5$ | 15 |
| $C_4H_9$—Cy—$CH_2O$—Ph—Py1—$C_6H_{13}$ | 7 |
| $C_5H_{11}$—Cy—$CH_2O$—Ph—Py1—$C_6H_{13}$ | 7 |
| $C_9H_{19}O$—Ph—$OCH_2$—Ph—Ph—$C_7H_{15}$ | 4 |
| $C_6H_{13}$*$CH(CH_3)O$—Ph—COO—Ph—Ph—OCO*$CH(CH_3)OC_4H_9$ | 2 |
| $C_{12}H_{25}$—Py2—Ph—OCO*CH(Cl)*$CH(CH_3)C_2H_5$ | 2 |

The liquid crystal composition E was further mixed with the following compounds in the proportions indicated below to provide a liquid crystal composition F.

| Ex. Comp. No. | wt. parts |
| --- | --- |
| 26 | 2 |
| 138 | 1 |
| 169 | 1 |
| Composition E | 96 |

A liquid crystal device was prepared in the same manner as in Example 10 except that the above liquid crystal composition F was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
| --- | --- | --- | --- |
| Response time (μsec) | 507 | 256 | 148 |
| Ratio (10° C./40° C.) | 3.4 | | |

Comparative Example 2

A liquid crystal device was prepared and subjected to measurement of response time and evaluation of a temperature-dependence of response time in the same manner as in Example 10 except for injecting the composition E alone used in Example 13 into a blank cell, whereby the following results were obtained.

|  | 10° C. | 25° C. | 40° C. |
| --- | --- | --- | --- |
| Response time (μsec) | 784 | 373 | 197 |
| Ratio (10° C./40° C.) | 4.0 | | |

EXAMPLE 14

A liquid crystal composition G was prepared by mixing the following Example Compounds instead of those used in Example 13 in the indicated proportions with the liquid crystal composition E.

| Ex. Comp. No. | wt. parts |
| --- | --- |
| 12 | 2 |
| 34 | 1 |
| 67 | 1 |
| Composition E | 96 |

A liquid crystal device was prepared in the same manner as in Example 10 except that the above liquid crystal composition G was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
|---|---|---|---|
| Response time (μsec) | 472 | 231 | 130 |
| Ratio (10° C./40° C.) | 3.6 | | |

EXAMPLE 15

A liquid crystal composition H was prepared by mixing the following Example Compounds instead of those used in Example 14 in the indicated proportions with the liquid crystal composition E.

| Ex. Comp. No. | wt. parts |
|---|---|
| 115 | 2 |
| 148 | 1 |
| 155 | 1 |
| Composition E | 96 |

A liquid crystal device was prepared in the same manner as in Example 10 except that the above liquid crystal composition H was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
|---|---|---|---|
| Response time (μsec) | 528 | 272 | 161 |
| Ratio (10° C./40° C.) | 3.3 | | |

EXAMPLE 16

A liquid crystal composition I was prepared by mixing the following compounds in the indicated proportions.

| Structural formula | wt. parts |
|---|---|
| $C_8H_{17}$—Py2—Ph—$OC_6H_{13}$ | 10 |
| $C_8H_{17}$—Py2—Ph—$OC_9H_{19}$ | 5 |
| $C_{10}H_{21}$—Py2—Ph—$OCOC_8H_{17}$ | 7 |
| $C_{10}H_{21}$—Py2—Ph—$O(CH_2)_3CH(CH_3)OC_3H_7$ | 7 |
| $C_{12}H_{25}$—Py2—Ph—$O(CH_2)_4CH(CH_3)OCH_3$ | 6 |
| $C_5H_{11}$—Py2—Ph—Ph—$C_6H_{13}$ | 5 |
| $C_7H_{15}$—Py2—Ph—Ph—$C_6H_{13}$ | 5 |
| $C_4H_9$—Cy—COO—Ph—Py1—$C_{12}H_{25}$ | 8 |
| $C_3H_7$—Cy—COO—Ph—Py1—$C_{10}H_{21}$ | 8 |
| $C_9H_{19}O$—Ph—COO—Ph—$OC_5H_{11}$ | 20 |
| $C_8H_{17}$—Ph—COO—Ph—Ph—$OCH_2CH(CH_3)C_2H_5$ | 5 |
| $C_8H_{17}$—Ph—OCO—Ph—Ph—C*H($CH_3$)$OCOC_6H_{13}$ | 5 |
| $C_6H_{13}$—Ph—$OCH_2$—Ph—Ph—$C_7H_{15}$ | 6 |
| $C_{12}H_{25}$—Py2—Ph—$OCH_2$C*H(F)$C_6H_{13}$ | 3 |

The liquid crystal composition I was further mixed with the following compounds in the proportions indicated below to provide a liquid crystal composition J.

| Ex. Comp. No. | wt. parts |
|---|---|
| 72 | 2 |
| 106 | 1 |
| 111 | 1 |
| Composition I | 96 |

A liquid crystal device was prepared in the same manner as in Example 10 except that the above liquid crystal composition J was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
|---|---|---|---|
| Response time (μsec) | 388 | 195 | 102 |
| Ratio (10° C./40° C.) | 3.8 | | |

Comparative Example 3

A liquid crystal device was prepared and subjected to measurement of response time and evaluation of a temperature-dependence of response time in the same manner as in Example 10 except for injecting the composition I alone used in Example 16 into a blank cell, whereby the following results were obtained.

|  | 10° C. | 25° C. | 40° C. |
|---|---|---|---|
| Response time (μsec) | 653 | 317 | 159 |
| Ratio (10° C./40° C.) | 4.1 | | |

EXAMPLE 17

A liquid crystal composition K was prepared by mixing the following Example Compounds instead of those used in Example 16 in the indicated proportions with the liquid crystal composition I.

| Ex. Comp. No. | wt. parts |
|---|---|
| 64 | 1 |
| 136 | 2 |
| 171 | 1 |
| Composition I | 96 |

A liquid crystal device was prepared in the same manner as in Example 10 except that the above liquid crystal composition K was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
| --- | --- | --- | --- |
| Response time (μsec) | 436 | 223 | 122 |
| Ratio (10° C./40° C./) | 3.6 | | |

EXAMPLE 18

A liquid crystal composition L was prepared by mixing the following Example Compounds instead of those used in Example 17 in the indicated proportions with the liquid crystal composition I.

| Ex. Comp. No. | wt. parts |
| --- | --- |
| 41 | 2 |
| 50 | 1 |
| 79 · | 1 |
| Composition I | 96 |

A liquid crystal device was prepared in the same manner as in Example 10 except that the above liquid crystal composition L was used, and the device was subjected to measurement of optical response time, evaluation of a temperature-dependence of response time and observation of switching states. In the device, a monodomain with a good and uniform alignment characteristic was observed. The results of the measurement and evaluation are shown below.

|  | 10° C. | 25° C. | 40° C. |
| --- | --- | --- | --- |
| Response time (μsec) | 405 | 203 | 106 |
| Ratio (10° C./40° C.) | 3.8 | | |

As apparent from the above Examples 10 to 18, the liquid crystal devices including the liquid crystal compositions B, C, D, F, G, H, J, K and L, i.e., compositions containing an optically active compound of the formula (I) according to the present invention, provided improved operation characteristic at a lower temperature, high speed responsiveness and a decreased temperature-dependence of response speed.

EXAMPLE 19

A liquid crystal device was prepared in the same manner as in Example 12 except for using a 2% aqueous solution of polyvinyl alcohol resin (PVA-117, available from Kuraray K.K.) instead of the 1.5%-solution of polyimide resin precursor in dimethylacetoamide used in Example 12. The liquid crystal device was subjected to measurement response time and evaluation of a temperature-dependence of response time in the same manner as in Example 10. The results are shown below.

|  | 10° C. | 25° C. | 40° C. |
| --- | --- | --- | --- |
| Response time (μsec) | 387 | 203 | 115 |
| Ratio (10° C./40° C.) | 3.4 | | |

EXAMPLE 20

A liquid crystal device was prepared in the same manner as in Example 12 except for omitting the SiO$_2$ layer to form an alignment control layer composed of the polyimide resin layer alone. The liquid crystal device was subjected to measurement of response time and evaluation of a temperature-dependence of response time in the same manner as in Example 10. The results are shown below.

|  | 10° C. | 25° C. | 40° C. |
| --- | --- | --- | --- |
| Response time (μsec) | 395 | 208 | 118 |
| Ratio (10° C./40° C.) | 3.3 | | |

As is apparent from the above Examples 19 and 20, also in the case of a different device structure, the device containing the ferroelectric liquid crystal composition D according to the present invention provided an improved low-temperature operation characteristic and a decreased temperature dependence of response speed similarly as in Example 12.

EXAMPLE 21

A liquid crystal composition M was prepared by mixing the following compounds in the indicated proportions.

| Structural formula | wt. parts |
| --- | --- |
| $C_6H_{13}$—Py2—Ph—O(CH$_2$)$_4$C$_3$F$_7$ | 5 |
| $C_{11}H_{23}$—Py2—Ph—OCH$_2$C$_4$F$_9$ | 10 |
| $C_8H_{17}$—Pr1—Ph—O (CH$_2$)$_5$CH(CH$_3$)C$_2$H$_5$ | 5 |
| $C_{10}H_{21}$—Py$_2$—Ph—O (CH$_2$)$_4$CH(CH$_3$)OCH$_3$ | 10 |
| $C_6H_{13}$—Py2—Ph—Ph—C$_8$H$_{17}$ | 7 |
| $C_8H_{17}$—Py2—Ph—Ph—OC$_6$H$_{13}$ | 15 |
| $C_5H_{11}$—Cy—COO—Ph—Py1—C$_{12}$H$_{25}$ | 5 |
| $C_4H_9$—Cy—COO—Ph—Py1—C$_{11}$H$_{23}$ | 5 |
| $C_3H_7$—Cy—COO—Ph—Py1—C$_{11}$H$_{23}$ | 5 |
| $C_{12}H_{25}$O—Ph—Pa—CO(CH$_2$)$_3$C*H(CH$_3$)C$_2$H$_5$ | 2 |
| $C_{10}H_{21}$—Py2—Ph—OCH$_2$C*H(F)C$_2$H$_5$ | 5 |
| $C_6H_{13}$—Cy—COO—Ph—OCH$_2$C*H(F)C$_6$H$_{13}$ | 2 |
| $C_8H_{17}$—Ph—OCO—Ph—Ph—CH(CH$_3$)OCOC$_6$H$_{13}$ | 6 |
| $C_8H_{17}$—Py2—Ph—OCO—Ph—F | 2 |
| $C_7H_{15}$O—Ph—Tz1—Ph—C$_5$H$_{11}$ | 3 |
| $C_6H_{13}$O—Btb2—Ph—OCO(CH$_2$)$_6$C$_2$F$_5$ | 3 |
| $C_8H_{17}$O—Ph—COS—Ph—OCH$_2$C$_3$F$_7$ | 10 |

The liquid crystal composition M was further mixed with the following example compounds in the indicated proportions to provide a liquid crystal composition N.

| Ex. Comp. No. | wt. parts |
| --- | --- |
| 23 | 1 |
| 39 | 1 |
| 53 | 1 |
| Composition M | 97 |

Two 0.7 mm-thick glass plates were provided and respectively coated with an ITO film to form an electrode for voltage application, which was further coated with an insulating layer of vapor-deposited SiO$_2$. On the insulating layer, a 0.2%-solution of silane coupling agent (KBM-602, available from Shinetsu Kagaku K.K.) in isopropyl alcohol was applied by spinner coating at a speed of 2000 rpm for 15 seconds and subjected to hot curing treatment at 120 ° C. for 20 min.

Further, each glass plate provided with an ITO film and treated in the above described manner was coated with a 1.0%-solution of polyimide resin precursor (SP-510, available from Toray K.K.) in dimethylacetoamide by a spinner coater rotating at 3000 rpm for 15 seconds. Thereafter, the coating film was subjected to heat curing at 300° C. for 60 min. to obtain about 12 nm-thick film. The coating film was rubbed with acetate fiber-planted cloth. The thus treated two glass plates were washed with isopropyl alcohol. After silica beads with an average particle size of 1.5 microns were dispersed on one of the glass plates, the two glass plates were applied to each other with a bonding sealing agent (Lixon Bond, available from Chisso K.K.) so that their rubbed directions were parallel to each other and heated at 100° C. for 60 min. to form a blank cell. The cell gap was found to be about 1.5 μm as measured by a Berek compensator.

Then, the liquid crystal composition N prepared above was heated into an isotropic liquid, and injected into the above prepared cell under vacuum and, after sealing, was gradually cooled to 25° C. at a rate of 20° C./hour to prepare a liquid crystal device (FLC device).

The liquid crystal device was subjected to measurement of a contrast ratio at 30° C. when the device was driven by applying a driving voltage waveform shown in FIGS. 5A and 5B (bias ratio=⅓), whereby a contrast ratio at 30° C. of 16.2 was obtained.

Comparative Example 4

A liquid crystal device was prepared and subjected to measurement of a contrast ratio in the same manner as in Example 21 except for injecting the composition M alone used in Example 21 into a blank cell, whereby a contrast ratio at 30° C. of 8.1 was obtained.

EXAMPLE 22

A liquid crystal composition O was prepared by mixing the following Example Compounds instead of those used in Example 21 in the indicated proportions with the liquid crystal composition M.

| Ex. Comp. No. | wt. parts |
| --- | --- |
| 6 | 1 |
| 77 | 1 |
| 91 | 1 |
| Composition M | 97 |

A liquid crystal device was prepared in the same manner as in Example 21 except that the above liquid crystal composition O was used, and the device was subjected to measurement of a contrast ratio at 30 ° C. in the same manner as in Example 21, whereby a contrast ratio at 30° C. of 21.5 was obtained.

EXAMPLE 23

A liquid crystal composition P was prepared by mixing the following Example Compounds instead of those used in Example 22 in the indicated proportions with the liquid crystal composition M.

| Ex. Comp. No. | wt. parts |
| --- | --- |
| 7 | 1 |
| 55 | 1 |
| 142 | 1 |
| Composition M | 97 |

A liquid crystal device was prepared in the same manner as in Example 21 except that the above liquid crystal composition P was used, and the device was subjected to measurement of a contrast ratio at 30 ° C. in the same manner as in Example 21, whereby a contrast ratio at 30° C. of 13.7 was obtained.

EXAMPLE 24

A liquid crystal composition Q was prepared by mixing the following Example Compounds instead of those used in Example 23 in the indicated proportions with the liquid crystal composition M.

| Ex. Comp. No. | wt. parts |
| --- | --- |
| 57 | 1 |
| 139 | 1 |
| 145 | 1 |
| Composition M | 97 |

A liquid crystal device was prepared in the same manner as in Example 21 except that the above liquid crystal composition Q was used, and the device was subjected to measurement of a contrast ratio at 30 ° C. in the same manner as in Example 21, whereby a contrast ratio at 30° C. of 18.8 was obtained.

As apparent from the above Examples 21 to 24, the liquid crystal devices including the liquid crystal compositions N, O, P and Q, i.e., compositions containing an optically active compound of the formula (I) according to the present invention, provided improved a higher contrast ratio when driven.

A liquid crystal device was prepared in the same manner as in Example 22 except for using a 2% aqueous solution of polyvinyl alcohol resin (PVA-117, available from Kuraray K.K.) instead of the 1.0%-solution of polyimide resin precursor in dimethylacetoamide. The liquid crystal device was subjected to measurement a contrast ratio in the same manner as in Example 21, whereby a contrast ratio at 30° C. of 18.3 was obtained.

EXAMPLE 26

A liquid crystal device was prepared in the same manner as in Example 22 except for omitting the $SiO_2$ layer to form an alignment control layer composed of the polyimide resin layer alone. The liquid crystal device was subjected to measurement of a contrast ratio in the same manner as in Example 21, whereby a contrast ratio at 30° C. of 20.9 was obtained.

EXAMPLE 27

A liquid crystal device was prepared in the same manner as in Example 22 except for using a 1.0%-solution of polyamide acid (LQ-1802, available from Hitachi Kasei K.K.) in NMP (N-methylpyrrolidone) instead of the 1.0%-solution of polyimide resin precursor in dimethylacetoamide. The liquid crystal device was subjected to measurement a contrast ratio in the same manner as in Example 21, whereby a contrast at 30° C. ratio of 28.1 was obtained.

As is apparent from the above Examples 25, 26 and 27, also in the case of a different device structure, the device containing the liquid crystal composition O according to the present invention provided a higher contrast ratio similarly as in Example 22.

Further, when a driving voltage waveform different from that used in Example 22 was used, liquid crystal devices using the liquid crystal compositions according to the present invention provided a higher contrast ratio compared with liquid crystal devices using liquid crystal compositions containing no optically active compound of the formula (I) of the present invention.

EXAMPLE 28

Production of optically active 3-(4-octyloxyphenyl)-5-(4-hexylphenyl)-2-oxazolidinone (Example Compound No. 23)

4 mg of lithium chloride and 1.0 ml of DMF were placed in a 20 ml-three necked flask. Under refluxing and stirring in nitrogen atmosphere, a solution of 0.97 g (3.92 mM) of 4-octyloxyphenyl isocyanate and 0.80 g (3.92 mM) of (−)-4-hexylstyrene oxide in 1.8 ml of DMF was added dropwise to the mixture in 5 minutes, followed by refluxing for 5 minutes under stirring. After the reaction, the reaction mixture was cooled to room temperature and poured into ice water to precipitate a crystal. The crystal was recovered by filtration, washed with water and dissolved in a toluene-ethyl acetate mixture solvent, followed by drying with anhydrous sodium sulfate and evaporation under reduced pressure to obtain a residue. The residue was purified by silica gel column chromatography and recrystallized from an acetone/methanol mixture solvent to obtain 0.25 g of optically active 3-(4-octylphenyl)-5-(4-hexylphenyl)-2-oxazolidinone (Yield: 14.1%). This compound showed the following phase transition series.

Phase transition temperature

Cry. ⇌ 80.5/74.3 Iso.

EXAMPLE 29

Production of optically active 3-(4-butylphenyl)-5-(4-hexylphenyl)-2-oxazolidinone (Ex. Comp. No. 2)

Optically active 3-(4-butylphenyl)-5-(4-hexylphenyl)-2-oxazolidinone was synthesized in the same manner as in Example 28 except that 4-butylphenyl isocyanate was used instead of 4-octyloxyphenyl isocyanate used in Example 28.

Phase transition temperature (° C.)

Cry. ⇌ 93.8/84.3 Iso.

EXAMPLE 30

Production of optically active 3-(4-heptyloxyphenyl)-5-(4-hexylphenyl)-2-oxazolidinone (Ex. Comp. No. 203)

Optically active 3-(4-heptyloxyphenyl)-5-(4-hexylphenyl)-2-oxazolidinone was synthesized in the same manner as in Example 28 except that 4-heptyloxyphenyl isocyanate was used instead of 4-octyloxyphenyl isocyanate used in Example 28.

Phase transition temperature (° C.)

Cry. ⇌ 75.2/68.8 Sm ⇌ 78.7/70.9 Iso.

EXAMPLE 31

Production of optically active 3-(4-methoxyphenyl)-5-(4-hexylphenyl)-2-oxazolidinone (Ex. Comp. No. 205)

Optically active 3-(4-methoxyphenyl)-5-(4-hexylphenyl)-2-oxazolidinone was synthesized in the same manner as in Example 28 except that 4-methoxyphenyl isocyanate was used instead of 4-octyloxyphenyl isocyanate used in Example 28.

Phase transition temperature (° C.)

Cry. ⇌ 85.5/75.8 Iso.

As described hereinabove, according to the present invention, by utilizing a ferroelectricity exhibited by a (chiral smectic) liquid crystal composition containing at least one optically active compound of the formula (I), there is provided a liquid crystal device providing improved characteristics such as a good alignment characteristic, a good switching property, high-speed responsiveness, a decreased temperature-dependence of response speed, and a high contrast ratio.

In addition, when the liquid crystal device is used as a display device in combination with a light source, drive circuit, etc., a liquid crystal apparatus, such as a liquid crystal display apparatus, providing good display characteristics can be realized.

What is claimed is:

1. An optically active compound represented by the following formula (I):

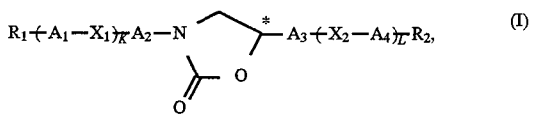

in which $R_1$ and $R_2$ independently denote halogen, H, CN, or a linear, branched or cyclized alkyl group having 2–30 carbon atoms, said alkyl group being capable of including one or two or more non-adjacent methylene groups which are optionally replaced by —O—, —S—, —CO—, —CO—O—, —O—CO—, —CH=CH— or —C≡C— and capable of including at least one H which is optionally replaced by F;

$A_2$ denotes 1,4-phenylene; 1,4-phenylene having one or two substituents selected from F, Cl, Br, $CH_3$, $CF_3$ and CN; pyrimidine-2,5-diyl; pyridine-2,5-diyl; thiophene-2,5-diyl; thiazole-2,5-diyl; 2,6-naphthylene; thiadiazole-2,5-diyl; pyrazine-2,5-diyl; pyridazine-3,6-diyl; benzothiazole-2,6-diyl; benzoxazole-2,5-diyl; indan-2,5-diyl; 2-alkylindan-2,5-diyl having a linear or branched alkyl group having 1–18 carbon atoms; coumaran-2,5-diyl; 2-alkylcoumaran-2,5-diyl having a linear or branched alkyl group having 1–18 carbon atoms; quinoxaline-2,6-diyl; or quinoline-2,6-diyl;

$A_1$, $A_3$ and $A_4$ independently denote $A_2$; 1,4-cyclohexylene; 1,3-dioxane-2,5-diyl; or 1,3-dithiane-2,5-diyl;

K and L are independently 0 or 1;

$X_1$ and $X_2$ independently denote a single bond, —COO—, —OCO—, —$CH_2$O—, —O$CH_2$—, —$CH_2CH_2$— or —C≡C—;

* denotes the location of an optically active center; and with the proviso that $R_1$ and $R_2$ cannot be H at the same time.

2. A compound according to claim 1, wherein said optically active compound of the formula (I) satisfies any one of the following conditions (Ia) to (Ic):

(Ia) both of K and L are 0, (Ib) K is 0 and L is 1, and (Ic) K is 1 and L is 0.

3. A compound according to claim 1, wherein said optically active compound of the formula (I) satisfies any one of the following conditions (Iaa) to (Ica):

(Iaa) both of K and L are 0; $A_2$ is 1,4-phenylene; 1,4-phenylene having one or two substituents, pyrimidine-2,5-diyl, pyridine-2,5-diyl, thiophene-2,5-diyl, 2,6-naphthylene, thiazole-2,5-diyl, thiadiazole-2,5-diyl, pyrazine-2,5-diyl or pyridazine-3,6-diyl; and $A_3$ is $A_2$, 1,4-cyclohexylene, 1,3-dioxane-2,5-diyl or 1,3-dithiane-2,5-diyl, (Iab) both of K and L are 0; $A_2$ is benzothiazole-2,6-diyl, benzoxazole-2,5-diyl, quinoxaline-2,6-diyl or quinoline-2,6-diyl; and $A_3$ is 1,4-cyclohexylene, 1,3-dioxane-2,5-diyl or 1,3-dithiane-2,5-diyl, (Iba) K is 0 and L is 1; $A_2$ is 1,4-phenylene; 1,4-phenylene having one or two substituents, pyrimidine-2,5-diyl, pyridine-2,5-diyl, thiophene-2,5-diyl, 2,6-naphthylene, thiazole-2,5-diyl, thiadiazole-2,5-diyl, pyrazine-2,5-diyl or pyridazine-3,6-diyl; and each of $A_3$ and $A_4$ is $A_2$, 1,4-cyclohexylene, 1,3-dioxane-2,5-diyl or 1,3-dithiane-2,5-diyl, and (Ica) K is 1 and L is 0; $A_2$ is 1,4-phenylene; 1,4-phenylene having one or two substituents, pyrimidine-2,5-diyl, pyridine-2,5-diyl, thiophene-2,5-diyl, 2,6-naphthylene, thiazole-2,5-diyl, thiadiazole-2,5-diyl, pyrazine-2,5-diyl or pyridazine-3,6-diyl; and each of $A_1$ and $A_3$ is $A_2$, 1,4-cyclohexylene, 1,3-dioxane-2,5-diyl or 1,3-dithiane-2,5-diyl.

4. A compound according to claim 1, wherein both of K and L in the formula (I) are 0; $A_2$ in the formula (I) is 1,4-phenylene or 1,4-phenylene having one or two substituents; and $A_3$ in the formula (I) is $A_2$ or 1,4-cyclohexylene.

5. A compound according to claim 1, wherein $R_1$ and $R_2$ in the formula (I) are independently any one of the following groups (i) to (xvi):

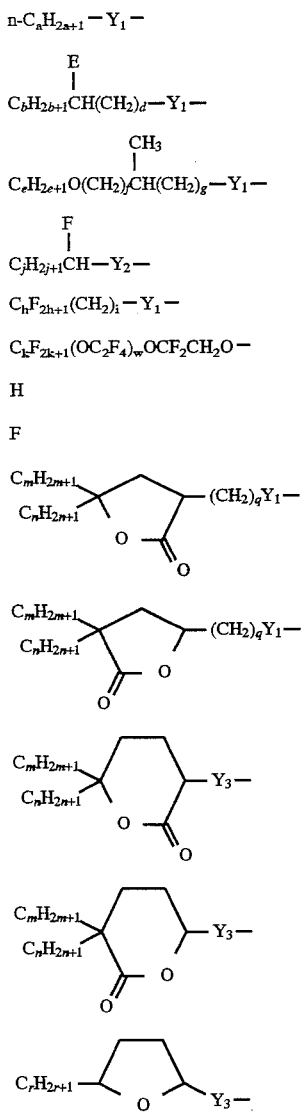

(i) n-$C_aH_{2a+1}$—$Y_1$—

(ii) $C_bH_{2b+1}CH(CH_2)_d$—$Y_1$— with E substituent (iii) $C_eH_{2e+1}O(CH_2)_fCH(CH_2)_g$—$Y_1$— with $CH_3$ substituent (iv) $C_jH_{2j+1}CH$—$Y_2$— with F substituent (v) $C_hF_{2h+1}(CH_2)_i$—$Y_1$—

(vi) $C_kF_{2k+1}(OC_2F_4)_wOCF_2CH_2O$—

(vii) H (viii) F (ix)–(xiii) [ring structures as shown]

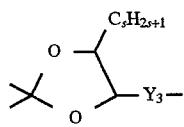
(xiv)

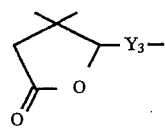
(xv)

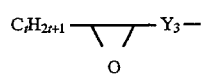
(xvi)

wherein a is an integer of 1–16; d, g and i independently denotes an integer of 0–7; b, c, h, j and k independently denotes an integer of 1–10; each of f and w is 0 or 1; m, n, q, r, s and t independently denote an integer of 0–10, with the proviso that b+d≦16, e+f+g≦16, and h+i≦16; E is $CH_3$ or $CF_3$; $Y_1$ is a single bond, —O—, —COO— or —OCO—; $Y_2$ is —COO—, —$CH_2O$—, $CH_2CH_2O$—, —$CH_2CH_2CH_2O$— or —$CH_2CH_2$—; and $Y_3$ is a single bond, —COO—, —$CH_2O$—, —OCO— or —$OCH_2$—.

6. A liquid crystal composition comprising at least two compounds, at least one of which is an optically active compound of the formula (I) according to any one of claims 1 to 5.

7. A liquid crystal composition according to claim 6, which comprises 1–80 wt. % of an optically active compound of the formula (I).

8. A liquid crystal composition according to claim 6, which comprises 1–60 wt. % of an optically active compound of the formula (I).

9. A liquid crystal composition according to claim 6, which comprises 1–40 wt. % of an optically active compound of the formula (I).

10. A liquid crystal composition according to claim 6, which has a chiral smectic phase.

11. A liquid crystal device, comprising a pair of electrode plates and a liquid crystal composition according to claim 6 disposed between the electrode plates.

12. A device according to claim 11, which further comprises an alignment control layer disposed on at least one of the electrode plates.

13. A device according to claim 11, wherein the alignment control layer has been subjected to uniaxial alignment treatment.

14. A device according to claim 11, wherein the liquid crystal composition is disposed in a thickness suppressing formation of a helical structure of liquid crystal molecules between the electrode plates.

15. A liquid crystal apparatus comprising a liquid crystal device according to claim 11 and a drive circuit for driving the liquid crystal device.

16. An apparatus according to claim 15, wherein the liquid crystal device is a display device.

17. An apparatus according to claim 15, which further comprises a light source.

18. A display method, comprising:

providing a liquid crystal composition according to claim 6; and controlling the alignment direction of liquid crystal molecules in accordance with image data to effect display.

* * * * *

UNITED STATES PATENT AND TRADEMARK OFFICE
CERTIFICATE OF CORRECTION

PATENT NO. : 5,624,600

DATED : April 29, 1997

INVENTOR(S): TAKAO TAKIGUCHI ET AL.

It is certified that error appears in the above-identified patent and that said Letters Patent is hereby corrected as shown below:

<u>ON TITLE PAGE, item [56] References Cited,
FOREIGN PATENT DOCUMENTS</u>

"03151371" should read --3-151371--;
"04234378" should read --4-234378--.

<u>COLUMN 2</u>
Line 4, "is" should read --are--;
Line 29, "electric" should read --electric field--.

<u>COLUMN 3</u>
Line 40, "tile" should read --tilt--.

<u>COLUMN 6</u>
Line 6, "structure." should read --structure;--;
Line 52, "A4:" should read --$A_4$:--

<u>COLUMN 7</u>
Line 34, "n-$C_nH_{2n+1}$-$Y_1$-" should read --n-$C_aH_{2a+1}$-$Y_1$---.

<u>COLUMN 8</u>
Line 25, "denotes" should read --denote--;
Line 26, "denotes" should read --denote--.

<u>COLUMN 12</u>
Table 1 under "No. 28": "$C_{86}H_{17}$" should read --$C_8H_{17}$--.

UNITED STATES PATENT AND TRADEMARK OFFICE
CERTIFICATE OF CORRECTION

PATENT NO. : 5,624,600

DATED : April 29, 1997

INVENTOR(S) : TAKAO TAKIGUCHI ET AL.

It is certified that error appears in the above-identified patent and that said Letters Patent is hereby corrected as shown below:

COLUMN 13
Table 1-continued, under "No. 42": "$C_6H_{13}CO$" should read
$$--C_{10}H_{21}\underset{\underset{O}{\|}}{C}O--$$
(with the indicated double-bonded O).

COLUMN 15
Table 1-continued, under "No. 97": "$OCH_2C_4F_{11}$" should read $--OCH_2C_5F_{11}--$.

COLUMN 17
Table 1-continued, under "No. 124": "$C_7H_{17}$" should read $--C_8H_{17}--$.

COLUMN 23
Line 34, "(IXIIdb)." should read --(XIIdb).--.

COLUMN 24
Line 52, "atoms" should read --atoms;--.

COLUMN 25
Line 60, "and" should be deleted.

COLUMN 26
Line 2, "formula (XVIa)" should read --formulae (XVIa)--.

UNITED STATES PATENT AND TRADEMARK OFFICE
CERTIFICATE OF CORRECTION

PATENT NO. : 5,624,600

DATED : April 29, 1997

INVENTOR(S): TAKAO TAKIGUCHI ET AL.

It is certified that error appears in the above-identified patent and that said Letters Patent is hereby corrected as shown below:

COLUMN 29
  Line 13, "At" should read --$\Delta$t--.

COLUMN 30
  Line 26, "70°C." should read ---70°C.---.

COLUMN 31
  Line 56, "temperature" should read --temperature (°C.)--.

COLUMN 32
  Line 24, "residue The" should read --residue. The--.

COLUMN 33
  Line 8, "$C_6H_{13}$-Py2-Ph-Ph-$CH_9$" should read
    --$C_6H_{13}$-Py2-Ph-Ph-$C_4H_9$--.

COLUMN 33
  Line 14, "$C_{12}H_{25}$-Py2-Ph-$OCH_2$*CH(F)$C_6H_{11}$" should read
    --$C_{12}H_{25}$-Py2-Ph-$OCH_2$*CH(F)$C_5H_{11}$--.

COLUMN 35
  Line 34, "$C_8H_{17}$-Pr2-Ph-O$(CH_2)_5$(CH($CH_3$)$C_2H_6$" should read
    --"$C_8H_{17}$-Pr2-Ph-O$(CH_2)_5$*CH($CH_3$)$C_2H_5$--.

COLUMN 40
  Line 16, "temperature dependence" should read
    --temperature-dependence--.

UNITED STATES PATENT AND TRADEMARK OFFICE
CERTIFICATE OF CORRECTION

PATENT NO. : 5,624,600

DATED : April 29, 1997

INVENTOR(S): TAKAO TAKIGUCHI ET AL.

It is certified that error appears in the above-identified patent and that said Letters Patent is hereby corrected as shown below:

COLUMN 42

Line 24, "improved a" should read --an improved--
Line 25, "driven." should read --driven.

EXAMPLE 25--;
Line 30, "measurement" should read --measurement of--;
Line 48, "measurement" should read --measurement of--;
Line 50, "at 30°C. ratio" should read --ratio at 30°C.--.

COLUMN 43
Line 17, "temperature" should read --temperature (°C.)--.

COLUMN 46
Line 17, "denotes" should read --denote--;
Line 18, "denotes" should read --denote--.

Signed and Sealed this

Fourth Day of November, 1997

Attest:

BRUCE LEHMAN

Attesting Officer

Commissioner of Patents and Trademarks